US006300398B1

(12) United States Patent
Jialanella et al.

(10) Patent No.: US 6,300,398 B1
(45) Date of Patent: Oct. 9, 2001

(54) POLYMER COMPOSITIONS HAVING IMPROVED ELONGATION

(75) Inventors: Gary Lee Jialanella, Stow, OH (US); Thomas J. McKeand, Jr., Freeport; Kalyan Sehanobish, Friendswood, both of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/059,753

(22) Filed: Apr. 14, 1998

Related U.S. Application Data (60) Provisional application No. 60/043,819, filed on Apr. 14, 1997.

(51) Int. Cl.$^7$ .................................................. C08L 23/08
(52) U.S. Cl. ...................... 524/275; 524/276; 524/277; 524/487; 524/490; 524/570; 524/571; 524/574
(58) Field of Search .................................. 524/275, 277, 524/276, 570, 571, 574, 487, 490

(56) References Cited

U.S. PATENT DOCUMENTS

| | | | |
|---|---|---|---|
| 3,264,272 | 8/1966 | Rees | 260/78.5 |
| 4,076,698 | 2/1978 | Anderson et al. | 526/348.6 |
| 4,237,037 | * 12/1980 | Takahashi . | |
| 4,379,190 | 4/1983 | Schenck | 428/95 |
| 4,798,081 | 1/1989 | Hazlitt et al. | 73/53 |
| 4,950,541 | 8/1990 | Tabor et al. | 428/373 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,089,321 | 2/1992 | Chum et al. | 428/218 |
| 5,096,867 | 3/1992 | Canich | 502/103 |
| 5,096,955 | 3/1992 | Johnston et al. | 524/398 |
| 5,132,380 | 7/1992 | Stevens et al. | 526/126 |
| 5,153,157 | 10/1992 | Hlatky et al. | 502/117 |
| 5,231,106 | 7/1993 | Knutsen et al. | 514/340 |
| 5,272,236 | 12/1993 | Lai et al. | 526/348.5 |
| 5,278,272 | 1/1994 | Lai et al. | 526/348.5 |
| 5,374,696 | 12/1994 | Rosen et al. | 526/126 |
| 5,453,410 | 9/1995 | Kolthammer et al. | 502/155 |
| 5,470,993 | 11/1995 | Devore et al. | 556/11 |
| 5,512,625 | * 4/1996 | Butterbach et al. | 524/490 |

FOREIGN PATENT DOCUMENTS

| | | | |
|---|---|---|---|
| 0 277 003 A1 | 8/1988 | (EP) | C08F/4/64 |
| 0 416 815 A2 | 8/1990 | (EP) | C08F/10/00 |
| 0 468 651 A1 | 1/1992 | (EP) | C08F/4/74 |
| 0 514 828 A1 | 11/1992 | (EP) | C07F/7/28 |
| 0 520 732 B1 | 12/1992 | (EP) | C08F/10/00 |
| 92/12212 | 7/1992 | (WO) | C09J/123/16 |
| 93/11190 | 6/1993 | (WO) | C08K/7/00 |
| 94/10256 | 5/1994 | (WO) | C09J/123/08 |
| 95/00683 | 1/1995 | (WO) | C25B/3/00 |
| 97/26287 | 7/1997 | (WO) | C08F/210/02 |
| 97/33921 | 9/1997 | (WO) | C08F/2/00 |

OTHER PUBLICATIONS

Zimm, Bruno H., et al., The Dimensions of Chain Molecules Containing Branches and Rings, The Journal of Chemical Physics, vol. 17, No. 12, pp. 1301–1314, Dec., 1949.
Randall, Rev. Macromol. Chem. Phys., C29 (2&3), pp. 285–297 (1989).
Rudin, Alfred, Measurement of Long–Chain Branch Frequency in Synthetic Polymers, Modern Methods of Polymer Characterization, Chapter 3, pp. 103–112 (1991).
Dealy, John, Rheometers for Molten Plastics, pp. 97–99 (1988).
Ramamurthy, A. V., Wall Slip in Viscous Fluids and Influence of Materials of Construction, Journal of Rheology, 30(2), pp. 337–357 (1986).
Shida, M., et al., Correlation of Low Density Polyethylene Rheological Measurements with Optical and Processing Properties, Polymer Engineering and Science, vol. 17, No. 11, pp. 769–744, Nov., 1977.
Wild, L., et al., Determination of Branching Distributions in Polyethylene and Ethylene Copolymers, Journal of Polymer Science: Polymer Physics Edition, vol. 20, pp. 441–455 (1982).
Lai, S., et al., Dow Constrained Geometry Catalyst Technology (CGCT): New Rules for Ethylene a–Olefins Interpolymers–Controlled Rheology Polyolefins, pp. 1188–1192, ANTEC '93.
Reichle, Walter T., Catalytic Reactions by Thermally Activated, Synthetic, Anionic Clay Minerals, Journal of Catalysis, 94, pp. 547–557 (1985).
DeGroot, A. Willem, et al., Structure and Properties of Homogeneous Ethylene Alpha–Olefin Copolymers Produced by the INSITE Technology, Presentation to the Federation of Analytical Chemistry and Spectroscopy Society, St. Louis, Missouri (1994).

* cited by examiner

Primary Examiner—Ana Woodward (57) ABSTRACT

The subject invention is directed to polymer compositions which comprise a homogeneous ethylene/α-olefin interpolymer, a wax and a nucleating agent, wherein the nucleating agent is provided in an effective amount such that the percent elongation at break of the polymer composition is at least about fifty percent greater than the percent elongation at break of a comparative composition which lacks the nucleating agent. The polymer compositions of the invention will find utility in applications r equiring high elongation at break, while maintaining a high onset of crystallization temperature, such as in the high-speed coating of fabrics, carpet backing, floor tile and sheeting, and adhesives.

28 Claims, 1 Drawing Sheet

Figure 1

POLYMER COMPOSITIONS HAVING IMPROVED ELONGATION

This application claims priority from provisional application 60/043,819, filed on Apr. 14, 1997.

The subject invention is directed to polymer compositions having improved elongation. In particular, the subject invention is directed to polymer compositions which comprise a homogeneous linear or substantially linear ethylene polymer, a wax which has a low molecular weight and which has a higher crystalline melting point than the homogeneous linear or substantially linear ethylene polymer, and a nucleating agent.

Homogeneous ethylene polymers having a density less than about 0.910 g/cm$^3$, particularly less than about 0.900 g/cm$^3$, preferably less about 0.890 g/cm$^3$, and most preferably less than about 0.880 g/cm$^3$, have good elongation properties, that is, such as a high elongation at break and the ability to withstand high degrees of stress before breaking, with the degree of elongation properties increasing as the density of the polymer decreases. However, homogeneous ethylene polymers having such elongation properties lack a highly crystalline fraction that imparts increased upper use temperature and favorably high onset of crystallization temperatures.

To compensate for the poor upper use temperature and low onset of crystallization temperature characteristic of homogeneous ethylene polymers having a density less than about 0.910 g/cm$^3$, it may be desirable to blend therewith a higher crystallinity material, such as a higher density homogeneous ethylene polymer or a traditional wax. However, while the addition of such a higher crystallinity material may increase the upper use temperature and provide a higher onset of crystallization temperature, it causes a highly deleterious loss of elongation properties.

Those in industry would find great advantage in polymer compositions which have favorable upper use temperatures and high onset of crystallization temperatures, but which retain favorable elongation at break and the ability to withstand high degrees of stress before breaking which is characteristic of homogeneous ethylene polymers having a density less than about 0.910 g/cm$^3$.

Hot melt adhesives comprising homogeneous linear or substantially linear ethylene polymers are further known. See, for instance, WO 97/33921, WO 92/12212, and WO 94/10256, each of which is incorporated herein by reference. While such hot melt adhesive formulations exhibit many commercially attractive attributes, it would be desirable for certain formulations to improve the elongation at break of these compositions. Those in industry would further find great advantage in hot melt adhesive formulations for use in formulations which require a high elongation at break, without incurring a detrimental effect on yield or break stress, such as, for instance, in bookbinding adhesives.

Accordingly, the subject invention provides a polymer composition comprising:

(a) a homogeneous ethylene/x-olefin interpolymer;
(b) a wax; and
(c) a nucleating agent, wherein the nucleating agent is provided in an effective amount such that the percent elongation at break of the polymer composition is at least fifty percent greater than the percent elongation at break of a comparative composition which lacks the nucleating agent.

In preferred embodiments, the homogeneous ethylene/α-olefin interpolymer will be a homogeneous linear or substantially linear ethylene/α-olefin interpolymer, which in turn preferably has a density less than about 0.910 g/cm$^3$, more preferably less than about 0.900 g/cm$^3$, even more preferably less than about 0.890 g/cm$^3$, and most preferably less than about 0.880 g/cm$^3$.

In preferred embodiments, the wax will be a paraffin wax, microcrystalline wax, Fischer-Tropsch wax, polyethylene or polyethylene by-product wax, or homogenous wax, which is preferably characterized as having a M$_w$ of no more than about 3000, and which has a density greater than that of the homogeneous ethylene polymer of component (a).

In preferred embodiments, the nucleating agent will be provided in an amount of at least about 0.01 weight percent, more preferably at least about 0.05 weight percent, even more preferably at least about 0.1 weight percent, and most preferably at least about 0.2 weight percent; preferably no more than about 10 weight percent, more preferably no more than about 5 weight percent, even more preferably no more than about 1 weight percent, and most preferably less than about 0.5 weight percent.

Preferred polymer compositions of the invention will exhibit a percent elongation at break which is at least four times greater than the percent elongation at break of a comparative composition which lacks the nucleating agent.

The subject invention further provides a hot melt adhesive composition comprising:

(a) an olefin polymer;
(b) a nucleating agent; and
(c) optionally, one or more of a tackifier, plasticizer or wax.

These and other embodiments are more fully described in the following detailed description, wherein.

The homogeneous ethylene/α-olefin interpolymer is a homogeneous linear or substantially linear ethylene/α-olefin interpolymer. By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), it does not additionally have a distinct lower temperature melting peak.

In addition or in the alternative, the homogeneity of the polymer may be described by the SCBDI (Short Chain Branching Distribution Index) or CDBI (Composition Distribution Breadth Index), which are defined as the weight percent of the polymer molecules having a conomomer content within 50 percent of the median total molar comonomer content. The SCBDI of a polymer is readily calculated from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), each of which is incorporated herein by reference. The SCBDI or CDBI for the homogeneous ethylene/α-olefin interpolymers useful in the invention is preferably greater than about 50 percent, more preferably greater than about 70 percent, with SCBDI's and CDBI of greater than about 90 percent being easily attained.

The homogeneous ethylene/α-olefin interpolymers useful in the invention are characterized as having a narrow molecular weight distribution ($M_w/M_n$). For the homogeneous ethylene/α-olefins useful in the polymer compositions of the invention, the $M_w/M_n$ is from about 1.5 to about 2.5, preferably from about 1.8 to about 2.2, most preferably about 2.0.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, that is, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from about 0.900 to about 0.935 g/cm$^3$, the homogeneous linear and substantially linear interpolymers useful in the invention require the presence of a comonomer to reduce the density to the range of from about 0.900 to about 0.935 g/cm$^3$.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons.

Methods for determining the amount of long chain branching present, both qualitatively and quantitatively, are known in the art.

For qualitative methods for determining the presence of long chain branching, see, for example, U.S. Pat. Nos. 5,272,236 and 5,278,272, each of which is incorporated herein by reference. As set forth therein, a gas extrusion rheometer (GER) may be used to determine the rheological processing index (PI), the critical shear rate at the onset of surface melt fracture, and the critical shear stress at the onset of gross melt fracture, which in turn indicate the presence or absence of long chain branching as set forth below.

The gas extrusion rheometer useful in the determination of rheological processing index (PI), the critical shear rate at the onset of surface melt fracture, and the critical shear stress at the onset of gross melt fracture, is described by M. Shida, R. N. Shroff, and L. V. Cancio in Polymer Engineering Science, Vol. 17, No. 11, p. 770 (1977), and in "Rheometers for Molten Plastics" by John Dealy, published by Van Nostrand Reinhold co. (1982) on pp. 97–99, each of which is incorporated herein by reference. GER experiments are performed at a temperature of 190° C., at nitrogen pressures between 250 and 5500 psig (between 1.72 and 37.9 MPa) using a 0.0754 mm diameter, 20:1 L/D die with an entrance angle of 180 degrees.

For substantially linear ethylene interpolymers, the PI is the apparent viscosity (in kpoise) of a material measured by GER at an apparent shear stress of 2.15×10$^6$ dynes/cm$^2$ (0.215 MPa). Substantially linear ethylene interpolymers useful in the invention will have a PI in the range of about 0.01 kpoise to about 50 kpoise, preferably about 15 kpoise or less. Substantially linear ethylene interpolymers have a PI which is less than or equal to about 70 percent of the PI of a linear ethylene interpolymer (either a Ziegler polymerized polymer or a homogeneous linear ethylene interpolymer) having the same comonomer or comonomers, and having an $I_2$, $M_w/M_n$, and density, each of which is within 10 percent of that of the substantially linear ethylene interpolymer.

An apparent shear stress versus apparent shear rate plot may be used to identify the melt fracture phenomena and to quantify the critical shear rate and critical shear stress of ethylene polymers. According to Ramamurthy, in the Journal of Rheology, 30(2), 1986, pp. 337–357, incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described gas extrusion rheometer, the onset of surface melt fracture is characterized as the beginning of losing extrudate gloss at which the surface roughness of the extrudate can only be detected by magnification at 40 times. The critical shear rate at the onset of surface melt fracture for a substantially linear ethylene interpolymer is at least 50 percent greater than the critical shear rate at the onset of surface melt fracture for a linear ethylene polymer having the same comonomer or comonomers and having an $I_2$, $M_w/M_n$ and density within ten percent of that of the substantially linear ethylene polymer.

Gross melt fracture occurs at unsteady extrusion flow conditions and ranges from regular (alternating rough and smooth, helical, etc.) to random distortions. The critical shear stress at the onset of gross melt fracture of substantially linear ethylene interpolymers, especially those having a density greater than about 0.910 g/cm$^3$, is greater than 4×10$^6$ dynes/cm$^2$ (0.4 MPa).

The presence of long chain branching may further be qualitatively determined by the Dow Rheology Index (DRI), which expresses a polymer's "normalized relaxation time as the result of long chain branching." (See, S. Lai and G. W. Knight, ANTEC '93 Proceedings, INSITE™ Technology Polyolefins (SLEP)—New Rules in the Structure/Rheology Relationship of Ethylene α-Olefin Copolymers, New Orleans, La., May 1993, incorporated herein by reference. DRI values range from 0 for polymers which do not have any measurable long chain branching, such as Tafmer™ products available from Mitsui Petrochemical Industries and Exact™ products available from Exxon Chemical company) to about 15, and are independent of melt index. In general, for low to medium pressure ethylene polymers, particular at lower densities, DRI provides improved correlations to melt elasticity and high shear flowability relative to correlations of the same attempted with melt flow ratios. Substantially linear ethylene interpolymers will have a DRI of preferably at least about 0.1, more preferably at least about 0.5, and most preferably at least about 0.8.

DRI may be calculated from the equation:

$$DRI = (3.652879 * \tau_o^{1.00649}/\eta_o - 1)/10$$

where $\tau_o$ is the characteristic relaxation time of the interpolymer and $\eta_o$ is the zero shear viscosity of the interpolymer. Both $\tau_o$ and $\eta_o$ are the "best fit" values to the Cross equation, that is, $$\eta/\eta_o = 1(1+(\gamma^*\tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a gas extrusion rheometer (GER) at extrusion pressures from 1,000 to 5,000 psi (6.89 to 34.5 MPa), which corresponds a shear stress of from 0.086 to 0.43 MPa, using a 0.0754 mm diameter, 20:1 L/D die at 190° C. Specific material determinations may be performed from 140 to 190° C. as required to accommodate melt index variations.

For quantitative methods for determining the presence of long chain branching, see, for example, U.S. Pat. Nos. 5,272,236 and 5,278,272; Randall (Rev. Macromol. Chem. Phys., C29 (2&3), p. 285–297), which discusses the measurement of long chain branching using $^{13}C$ nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV). Each of these references is incorporated herein by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., incorporated herein by reference, presented data demonstrating that GPC-DV is a useful technique for quantifying the presence of long chain branches in substantially linear ethylene polymers. In particular, deGroot and Chum found that the presence of long chain branches in substantially linear ethylene polymers correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers. deGroot and Chum also showed that a plot of log($I_2$, melt index) as a function of log(GPC weight average molecular weight), as determined by GPC-DV, illustrates that the long chain branching aspects (but not the extent of long chain branching) of substantially linear ethylene polymers are comparable to those of high pressure, highly branched low density polyethylene (LDPE) and are clearly distinct from heterogeneously branched ethylene polymers produced using Ziegler-type catalysts (such as linear low density polyethylene and ultra low density polyethylene) as well as from homogeneous linear ethylene polymers (such as Tafmer™ products available from Mitsui Petrochemical Industries and Exact™ products available from Exxon Chemical Company).

The first polymer will be an interpolymer of ethylene with at least one comonomer selected from the group consisting of $C_3$–$C_{20}$ α-olefins, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene. The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

The homogeneous ethylene polymer useful as component (a) of the polymer composition of the invention may further be an ultra-low molecular weight ethylene polymer.

Ultra-low molecular weight polymers may be made in accordance with the Examples herein and with the procedures set forth below. Ultra-low molecular weight polymers are disclosed and claimed in WO 97/26287, incorporated herein by reference.

The homogeneous ethylene polymer may be suitably prepared using a single site metallocene or a constrained geometry metal complex. Constrained geometry metal complexes are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 720,041, filed Jun. 24, 1991, (EP-A-514,828) certain borane derivatives of the foregoing constrained geometry catalysts are disclosed and a method for their preparation taught and claimed. In U.S. Pat.No. 5,453,410 combinations of cationic constrained geometry catalysts with an alumoxane were disclosed as suitable olefin polymerization catalysts. Each of the above references is incorporated herein by reference.

Exemplary constrained geometry metal complexes in which titanium is present in the +4 oxidation state include but are not limited to the following: (n-butylamido)dimethyl ($\eta^5$-tetramethylcyclopentadienyl)silanetitanium (IV) dimethyl; (n-butylamido)dimethyl($\eta^5$-tetramethylcyclopentadienyl)silanetitanium (IV) dibenzyl; (t-butylamido)dimethylr($\eta^5$-tetramethylcyclopentadienyl) silanetitanium (IV) dimethyl; (t-butylamido)dimethyl($\eta^5$-tetramethylcyclopentadienyl)silane-titanium (IV) dibenzyl;

(cyclododecylamido)dimethyl(η⁵-tetramethylcyclopentadienyl)silanetitanium (IV) dibenzyl; (2,4,6-trimethylaniido)dimethyl-(η⁵-tetramethylcyclopentadienyl)silanetitanium (IV) dibenzyl; (1-adamantyl-amido)dimethyl (η⁵-tetramethylcyclopentadienyl) silanetitanium (IV) dibenzyl; (t-butylamido)dimethyl(η⁵-tetramethylcyclopentadienyl)silanetitanium (IV) dimethyl; (t-butylamido)dimethyl(η⁵-tetramethylcyclopentadienyl)silanetitanium (IV) dibenzyl; (1-adamantylamido)dimethyl(η⁵-tetramethylcyclo-pentadienyl)silanetitanium (IV) dimethyl;; (n-butylamido)diisopropoxyl(η⁵-tetramethylcyclopentadienyl)silanetitanium (IV) dimethyl; (n-butylamnido)diisopropoxy(η⁵-tetramethylcyclopentadienyl)silanetitanium (IV) dibenzyl; (cyclododecylamido)-diisopropoxy(η⁵-tetramethylcyclopentadienyl)silanetitanium (IV) dimethyl; (cyclododecylamido)diisopropoxy(η⁵-tetramethylcyclopentadienyl)silanetitanium (IV) dibenzyl; (2,4,6-trimnthylaniido)diisopropoxy(η⁵-tetramethylcyclopentadienyl)silanetitanium (IV) dibenzyl; (2,4,6-trimethylanilido)diisopropoxy(η⁵-tetramethylcyclopentadienyl)silanetitanium (IV) dibenzyl; (cyclododecylamido)dimethoxy(η⁵-tetramethylcyclopentadienyl)silanetitanium (IV) dibenzyl; (cyclododecylamido)dimethoxy(η⁵-tetramethylcyclopentadienyl)silanetitanium (IV) dimethyl; (cyclododecylamido)diieroxy(η⁵-tetramethylcyclopentadienyl)silanetitanium (IV) dibenzyl; (1-adamantylamido)diisopropoxy(η⁵-tetramethylcyciopentadienyl)-silanetitanium (IV) dimethyl; (1-adamatylamido)diisopropoxy(η⁵-tetramethylcyclopentadienyl)silanetitanium (IV) dimethyl; (n-butylamido)dimethoxy-(η⁵-tetramethylcyclopentadienyl)silanetitanium (IV) dibenzyl; (2,4,6-trimethylanilido) dimethoxy( η⁵-tetramethylcyclopentadienyl)silanetitanium (IV) dimethyl; (2,4,6-trimethylanilido)dimethoxy(η⁵-tetramethylcyclopentadienyl)silane-titanium (IV) dibenzyl:, (1-adamantylamido)dimethoxy(η⁵-tetramethylcyclopentadienyl)silanetitanium (IV) dimethyl; (1-adamantylamido)dimethoxy(η⁵-tetramethylcyclopentadienyl)silanetitanium (IV) dibenzyl; (n-butylamido)-ethoxymethyl(η⁵-tetramethylcyclopentadienylsilanetitanium (IV) dimethyl; (n-butylamido)ethoxymethyl(η⁵-tetramethylcyclopentadienyl)silanetitanium (IV) dibenzyl; (cyclododecylamido)ethoxymethyl(η⁵-tetramethylcyclopentadienyl)-silanetitanium (IV) dimethyl; (cyclododecylamido)ethoxymethyl(η⁵-tetramethyl-cyclopentadienyl)silanetitanium (IV) dibenzyl; (2,4,6-trimethylanilido)ethoxymethyl-(η⁵-tetramethylcyclopentadienyl)silanetitanium (IV) dimethyl; (2,4,6-trimethylanilido)ethoxymnethyl(η⁵-tetramethylcyclopentadienyl)silanetitanium (IV) dibenzyl; (cyclododecylamido)dimethyl(η⁵-tetramethylcyclopentadienyl)silanetitanium (IV) dimethyl; (1-adamantylamido)-ethoxymethyl(η⁵-tetramethylcyclopentadienyl)silanetitanium (IV) dibenzyl; and (1-adamethylamido) ethoxymnethyl(η⁵-tetramethylcyclo-pentadienyl)silanetitanium (IV) dibenzyl.

Exemplary constrained geometry metal complexes in which titanium is present in the +3 oxidation state include but are not limited to the following: (n-butylamido) diimethyl(η⁵-tetramethylcyclopentadienyl)silanetitanium (III) 2-(N,N-dimethylamino)benzyl; (t-buty lamido) dimethyl(η⁵-tetramethylcyclopentadienyl)silanetitanium (III) 2-(N,N-dimethylamino)benzyl; (cyclododecylamdido) dimethyl η⁵-tetramethylcyclopentadienyl) silanetitanium (III) 2-(N,N-dimethylamino)benzyl; (2,4,6-trimethylanitido)dimethyl(η⁵-tetramethylcyclopentadienyl) silanetitanium (III) 2-(N,N-dimethylamino)benzyl; (1-adamantylamido)dimethyl(η⁵-tetramethylcyclopentadienyl)silanetitanium (III) 2-(N,N-dimethylamino)benzyl; (t-butylamido)dimethyl(η⁵-tetramethylcyclopentadienyl) silanetitanium (III) 2-(N,N-dimethylamino)benzyl; (n-butylamdido)diisopropoxy(η⁵-tetramethylcyclopentadienyl)silanetitanium (III) 2-(N,N-dimethylamino)benzyl; (cyclododecylamido)diisopropoxy (η⁵-tetramethylcyclopentadienyl)-silanetitanium (III) 2-(N, N-dimethylamino)benzyl; (2,4,6-trimethylanilido) diisopropoxy(η⁵-2-methylindenyl) silanetitanium (III) 2-(N, N-dimethylamino)benzyl; (1-adamantylamido) diisopropoxy(η⁵-tetramethylcyclopentadienyl) silanetitanium (III) 2-(N,N-dimethylamino)benzyl; (n-butylamido)dimethoxy(η⁵-tetramethylcyclopentadienyl) silanetitanium (III) 2-(N ,N-dimethylamino)benzyl; (cyclododecylamido)dimethoxy(η⁵-tetramethylcyclopentadienyl silanetitanium (III) 2-(N,N-dimethylamino)benzyl; (1-adamantylamido)dimethoxy (tetramethylcyclopentadienyl)silanetitanium (III) 2-(N,N-dimethylamino)benzyl; (2,4,6-trimethylanilido)dimethoxy (η⁵-tetramethylcyclopentadienyl)silanetitanium (III) 2-(N, N-dimethylamino)benzyl; (n-butylamido)ethoxymethyl(η⁵-tetramethylcyclopentadienyl)silanetitanium (III) 2-(N,N-dimethylamino)benzyl; (cyclododecylamido)ethoxymethyl (η⁵-tetramethylcyclopentadienyl)silanetitanium (III) 2-(N, N-dimethylamino)benzyl; (2,4,6-trimethylanilido) ethoxymethyl(η⁵-tetramethylcyclopentadienyl) silanetitaniu-n (III) 2-(N,N-dimethylamino)benzyl; and (1-adamantylamido)ethoxymethyl(η⁵-tetramethylcyclopentadienyl)silanetitanium (III) 2-(N,N-dimethylamino)benzyl.

Exemplary constrained geometry metal complexes in which titanium is present in the +2 oxidation state include but are not limited to the following: (n-butylamido)-dimethyl-(η⁵-tetramethylcyclopentadienyl)silanetitanium (II) 1,4-diphenyl-1,3-butadiene, (n-butylamido)dimethyl (η⁵-tetramethylcyclopentadienyl)silanetitanium (II) 1,4-diphenyl1,3butadiene; (t-butylamido)dimethyl(η⁵-tetramethylcyclopentadienyl)silanetitanium (II) 1,3-pentadiene; (t-butdeylamido)dimethyl(η⁵-tetramethylcyclopentadienyl)silanetitanium (II) 1,4-diphenyl-1,3-butadiene; (cyclododecylamido)dimethyl(η⁵-tetramethylcyclopentadienyl)silanetitanium (II) 1,3-pentadiene; (2,4,6-trimethyl-anilido)dimethyl(η⁵-tetramethylcyclopentadienyl)-silanetitanium (II) 1,4-diphenyl-1,3-butadiene; (2,4,6-trimethylanilido)dimethyl (η⁵-tetramethylcyclopentadienyl)silanetitanium (II) 1,3-pentadiene; (2,4,6-trimethylanilido)dimethyl(η⁵-tetramethylcyclopentadienyl)silanetitanium (IV) dimethyl; (1-adamantylamido)dimethyl(η⁵-tetramethylcyclopentadienyl)silane-titanium (II) 1,4-diphenyl-1,3-butadiene; (1-adamantylamido)dimethyl(η⁵-tetramethylcyclopentadienyl)silanetitanium (II) 1,3-pentadiene; (t-butylamido)-dimethyl(η⁵-tetramethylcyclopentadienyl)silanetitanium (II) 1,4-diphenyl-1,3-butadiene; (t-butyl-amido)dimethyl(η⁵-tetramethylcyclopentadienyl)silanetitanium (II) 1,3-pentadiene; (n-butylamido)diisopropoxy(η⁵-tetramethylcyclopentadienyl)-silanetitanium (II) 1,4-diphenyl-1,3-butadiene; (n-butylammido)diisopropoxy(η⁵-tetramethylcyclopentadienyl)silanetitanium (II) 1,3)-pentadiene; (cyclododecylamido)-diisopropoxy(η⁵-tetramethyl-cyclopentadienyl)silanetitanium (II)1,4-diphenyl-1,3-butadiene; (cyclododecylamido)diisopropoxy (η⁵-tetramethylcyclopentadienyl)-silanetitanium (II) 1,3- pentadiene; (2,4,6-trimethylanilido)diisopropoxy($\eta^5$-2-methyl-indenyl)silanetitanium (II) 1,4-diphenyl-1,3-butadiene; (2,4,6-trimethylanilido)-diisopropoxy($\eta^5$-tetramethylcyclopentadienyl)silanetitanium (II) 1,3-pentadiene; (1-adamantylamido)diisopropoxy($\eta^5$-tetramethyl-cyclopentadienyl)silanetitaniium (II) 1,4-diphenyl-1,3-butadiene; (1-adamantylamido)diisopropoxy ($\eta^5$-tetramethyl-cyclopentadienyl)silanetitanium (II) 1,3-pentadiene; (n-butylamido)dimethoxy($\eta^5$-tetramethylcyclopentadienyl)silanetitanium (II) 1,4-diphenyl-1,3-butadiene; (n-butylamido)dimethoxy($\eta^5$-tetramethylcyclopentadienyl)silanetitanium (II) 1,3-pentadiene; (cyclododecylamido)dimethoxy($\eta^5$-tetramethylcyclopentadienyl)-silanetitanium (II) 1,4-diphenyl-1,3-butadiene; (cyclododecylamido)dimethoxy ($\eta^5$-tetramethylcyclopentadienyl)silanetitanium (II) 1,3-pentadiene; (2,4,6-trimethylanilido)dimethoxy($\eta^5$-tetramethylcyclopentadienyl)silanetitanium (II) 1,4-diphenyl-1,3-butadiene; (2,4,6-trimethylanilido)dimethoxy ($\eta^5$-tetramethylcyclopentadienyl)silanetitanium (II) 1,3-)pentadiene; (1-adamantyl-amido)dimethoxy($\eta^5$-tetramethylcyclopentadienyl)silanetitanium (II) 1,4-diphenyl-1,3-butadiene; (1-adamantylamido)dimethoxy($\eta^5$-tetramethylcyclopentadienyl)-silanetitanium (II) 1,3-pentadiene; (n-butylamido)ethoxymethyl($\eta^5$-tetramethylcyclopentadienyl)silanetitanium (II) 1,4-diphenyl-1,3-butadiene; (n-butylamido)ethoxymethyl($\eta^5$-tetramethylcyclopentadienyl)silanetitanium (II) 1,3-pentadiene; (cyclododecylamido)ethoxymethyl($\eta^5$-tetramethylcyclopentadienyl)silanetitanium (II) 1,4-diphenyl-1,3-butadiene; (cyclododecylamido)ethoxymethyl ($\eta^5$-tetramethylcyclopentadienyl)silanetitanium (II) 1,3-pentadiene; (2,4,6-trimethylanilido)ethoxymethyl($\eta^5$-tetramethylcyclopentadienyl)silanetitanium (II) 1,4-diphenyl-1,3-butadiene; (2,4,6-trimethylanilido) ethoxymethyl($\eta^5$-tetramethylcyclopentadienyl) silanetitanium (II) 1,3-pentadiene; (1-adamantylamido) ethoxymethyl($\eta^5$-tetramethyl-cyclopentadienyl) silanetitanium (II) 1,4-diphenyl-1,3-butadiene; and (1-adamantylamido) ethoxymethyl($\eta^5$-tetramethylcyclopentadienyl)silanetitanium (II) 1,3-pentadiene.

The complexes can be prepared by use of well known synthetic techniques. The reactions are conducted in a suitable noninterfering solvent at a temperature from about −100 to about 300° C., preferably from about −78 to about 100° C., most preferably from about 0 to about 50° C. A reducing agent may be used to cause the metal to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof, cyclic and alicyclic hydrocarbons such as cyclohexane, cycloheptane, methylcyclohexane, methylcycloheptane, and mixtures thereof, aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U. S. Ser. No. 07/876,268), WO 95/00683 (equivalent to U.S. Ser. No. 08/82,201), and EP-A-520,732 (equivalent to U.S. Ser. No. 07/884,966 filed May 1, 1992). Each of the above references is incorporated herein by reference.

Suitable activating cocatalysts for use herein include perfluorinated tri(aryl)boron compounds, and most especially tris(pentafluorophenyl)borane; nonpolymeric, compatible, noncoordinating, ion forming 2 5 compounds (including the use of such compounds under oxidizing conditions), especially the use of ammonium-, phosphonium-, oxonium-, carbonium-, silylium- or sulfonium- salts of compatible, noncoordinating anions, and ferrocenium salts of compatible, noncoordinating anions. Suitable activating techniques include the use of bulk electrolysis. A combination ofthe foregoing activating cocatalysts and techniques may be employed as well.

Illustrative, but not limiting, examples ofboron compounds which may be used as an activating cocatalysts are: tri-substituted ammonium salts such as: trimethylammonium tetrakis(pentafluoro-phenyl) borate; triethylammonium tetrakis(pentafluorophenyl) borate; tripropylammonium tetrakis(pentafluorophenyl) borate; tri(n-butyl) ammonium tetrakis(pentafluorophenyl) borate; tri(sec-butyl)ammonium tetrakis(pentafluoro-phenyl) borate; N,N-dimethylanilinium tetrakis(pentafluorophenyl) borate; N,N-dimethylanilinium n-butyltris(pentafluorophenyl) borate; N,N-dimethylanilinium benzyltris (pentafluorophenyl) borate; N,N-dimethylanilinium tetrakis(4-(t-butyldimethylsilyl)-2,3,5,6-tetrafluorophenyl) borate; N,N-dimethylanilinium tetrakis(4-(triisopropylsilyl)-2,3,5,6-tetrafluorophenyl) borate; N,N-dimethylanilinium pentafluorophenoxytris (pentafluorophenyl) borate; N,N-diethylanilinium tetrakis(pentafluorophenyl) borate; N,N-dimethyl-2,4,6-trimethylanilinium tetrakis (pentafluorophenyl) borate; trimethylainmonium tetrakis(2,3,4,6-tetrafluorophenyl)borate; triethy lamimonium tetrakis (2,3,4,6-tetrafluorophenyl) borate; tripropylammonium tetrakis(2,3,4,6-tetrafluorophenyl) borate; tri(n-butyl) ammonium tetrakis(2,3,4,6-tetrafluorophenyl) borate; dimethyl(t-butyl) ammonium tetrakis(2,3,4,6-tetrafluorophenyl) borate; N,N-dimethylanilinium tetrakis (2,3,4,6-tetrafluorophenyl) borate; N,N-diethylanilinium tetrakis(2,3,4,6-tetrafluorophenyl) borate; and N,N-dimethyl-2,4,6-trimethylanilinium tetrakis(2,3,4,6-tetrafluorophenyl) borate;

disubstituted ammonium salts such as: di-(i-propyl) anmonium tetrakis (pentafluorophenyl) borate; and dicyclohexylammonium tetrakis(pentafluorophenyl) borate;

trisubstituted phosphonium salts such as: triphenylphosphonium tetrakis (pentafluoro-phenyl) borate; tri(o-tolyl)phosphonium tetrakis(pentafluorophenyl) borate; and tri(2,6-dimethylphenyl)phosphonium tetrakis (pentafluorophenyl) borate;

disubstituted oxonium salts such as: diphenyloxonium tetrakis(pentafluoro-phenyl) borate; di(o-tolyl) oxonium tetrakis(pentafluorophenyl) borate; and di(2, 6-dimethylphenyl)oxonium tetrakis (pentafluorophenyl) borate; and disubstituted sulfonium salts such as: diphenylsulfonium tetrakis (pentafluorophenyl) borate; di(o-tolyl) sulfonium tetrakis(pentafluorophenyl) borate; and bis (2,6-dimethylphenyl)sulfonium tetrakis (pentafluorophenyl) borate.

A most preferred activating cocatalyst is trispentafluorophenylborane.

Alumoxanes, especially methylalumoxane or triisobutylaluminum modified methylalumoxane are also suitable activators and may be used for activating the present metal complexes.

The molar ratio of metal complex: activating cocatalyst employed preferably ranges from about 1:1000 to about 2:1, more preferably from about 1:5 to about 1.5:1, most preferably from about 1:2 to about 1:1. In the preferred case in which a metal complex is activated by trispentafluorophenylborane and triisobutylaluminum modified methylalumoxane, the titanium:boron:aluminum molar ratio is typically from about 1:10:50 to about 1:0.5:0.1, most typically from about 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from about 1:100,000 to about 1:10, more preferably from about 1:50,000 to about 1:20, and most preferably from about 1:10,000 to about 1:30. In most polymerization reactions the molar ratio of catalyst:polymerizable compounds employed is from about $10^{-12}:1$ to about $10^{-1}:1$, more preferably from about $10^{-9}:1$ to about $10^{-5}:1$.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

The polymerization may be carried out as a batchwise or a continuous polymerization process, with continuous polymerizations processes being required for the preparation of substantially linear polymers. In a continuous process, ethylene, comonomer, and optionally solvent and diene are continuously supplied to the reaction zone and polymer product continuously removed therefrom.

In general, the homogeneous linear or substantially linear polymer may be polymerized at conditions for Ziegler-Natta or Kaminsky-Sinn type polymerization reactions, that is, reactor pressures ranging from atmospheric to about 3500 atmospheres (350 MPa). The reactor temperature should be greater than about 80° C., typically from about 100° C. to about 250° C., and preferably from about 100° C. to about 150° C., with temperatures at the higher end of the range, that is, temperatures greater than about 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be about 0:1. When the desired polymer has an $I_2$ of 1000 g/10 min., the hydrogen:ethylene molar ratio will typically be from about 0.45:1 to about 0.7:1. The upper limit of the hydrogen:ethylene molar ratio is typically about 2.2–2.5:1.

Generally the polymerization process is carried out with a differential pressure of ethylene of from about 10 to about 1000 psi (70 to 7000 kPa), most preferably from about 40 to about 60 psi (30 to 300 kPa.) The polymerization is generally conducted at a temperature of from about 80 to about 250° C. preferably from about 90 to about 170° C., and most preferably from greater than about 95 to about 140° C.

In most polymerization reactions the molar ratio of catalyst:polymerizable compounds employed is from about $10^{-12}:1$ to about $10^{-1}:1$, more preferably from about $10^{-9}:1$ to about $10^{-5}:1$.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from about 2.5:1 to about 12:1, beyond which point catalyst efficiency suffers. The most typical solvent:ethylene ratio (weight basis) is in the range of from about 5:1 to about 10:1.

The polymerization may further be conducted in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

The homogeneous ethylene polymer will typically be present in the composition of the invention in an amount of at least about 5 weight percent, preferably at least about 10 weight percent, more preferably at least about 20 weight percent, more preferably at least about 50 weight percent, and most preferably at least about 70 weight percent; typically less than about 99 weight percent, preferably less than about 95 weight percent, more preferably less than about 90 weight percent, and most preferably less than about 80 weight percent.

The homogeneous ethylene polymer will typically have a density of at least about 0.855 g/cm³, preferably at least about 0.860 g/m³, more preferably at least about 0.865 g/cm³, and most preferably at least about 0.865 g/cm³; typically no more than about 0.910 g/cm³, preferably no more than about 0.900 g/cm³, more preferably no more than about 0.890 g/cm³, and most preferably no more than about 0.880 g/cm³.

The homogeneous ethylene polymer will typically have a melt index ($I_2$) of at least about 50 g/10 min., preferably at least about 60 g/10 min.; preferably no more than about 10,000 g/10 min., more preferably no more than about 1500 g/10 min.

While the polymer compositions of the invention may usefully comprise a single homogeneous ethylene polymer, in combination with a wax and a nucleating agent, in exemplary preferred embodiments, two or more homogenous ethylene polymers may be employed, which differ from one another in terms of their density and/or melt index. In one preferred embodiment, the polymer composition will comprise a first homogeneous ethylene polymer and a second homogeneous ethylene polymer differing by at least about 20 g/10 min. in terms of melt index. In such embodiments, the first homogeneous ethylene polymer will have a melt index of at least about 1 g/10 min., preferably at least about 10 g/10 min., more preferably at least about 30 g/10 min., and most preferably at least about 50 g10 min.; preferably no more than about 200 g/10 min., more preferably no more than about 150 g/10 min., even more preferably no more than about 100 g/10 min., and most preferably no more than about 80 g/10 min. The second homogeneous ethylene polymer will have a melt index of at least about 100 g/10 min., preferably at least about 120 g10 min., more preferably at least about 170 g/1 min., more preferably at least about 220 g10 min.; preferably no more than about 10,000 g/10 min., more preferably no more than about 5000 g10 min., more preferably no more than about 3000 g/10 min., and most preferably no more than about 1500 g10 min.

The polymer compositions of the invention will fulther comprise a wax or other higher melting ethylene polymer (hereinafter collectively "waxes"). Such waxes will increase the upper use temperature and the onset of crystallization temperature of the polymer compositions. Accordingly, the wax will typically have a crystalline melting point, as determined by differential scanning calorimetry (DSC) which is at least about 10° C., preferably at least about 20° C., and most preferably at least about 30° C. greater than that of the homogeneous ethylene polymer. Waxes useful in the polymer compositions of the present invention include paraffin waxes, microcrystalline waxes, Fischer-Tropsch, polyethylene and by-products of polyethylene wherein the $M_w$ is less than 3000.

Also suitable are ultra-low molecular weight ethylene/α-olefin interpolymers prepared using a constrained geometry catalyst, and may be referred to as homogeneous waxes. Such homogeneous waxes, as well as processes for preparing such homogeneous waxes, are more fully described above in conjunction with the description of ultra-low molecular weight ethylene polymers. Homogeneous waxes lead to a low polymer and formulation viscosity, but are characterized by peak crystallization temperatures which are greater than the peak crystallization temperatures of corresponding higher molecular weight materials of the same density. homogeneous waxes will be either ethylene homopolymers or interpolymers of ethylene and a $C_3$–$C_{20}$ α-olefin. The homogeneous wax will have a number average molecular weight less than about 6000, preferably less than about 5000. Such homogeneous waxes will typically have a number average molecular weight of at least about 800, preferably at least about 1300.

Homogeneous waxes, in contrast to paraffinic waxes and crystalline ethylene homopolymer or interpolymer waxes, will have a $M_w/M_n$ of from about 1.5 about 2.5, preferably from about 1.8 to about 2.2.

In the case of polyethylene based waxes and homogeneous waxes, the wax will have a density greater than that of the homogeneous ethylene polymer of component (a) of the polymer compositions of the invention, and will typically have a density of at least about 0.910 g/cm³, preferably at least about 0.915 g/cm³, more preferably at about 0.920 g/cm³, and most preferably at least about 0.925 g/cm³.

The wax will typically be provided in the polymer composition of the invention in an amount of at least 1 weight percent, preferably at least about 5 weight percent, more preferably at least about 10 weight percent, and most preferably at least about 20 weight percent. The wax will typically be provided in the polymer composition of the invention in an amount of no more than about 40 weight percent, preferably no more than about 35 weight percent, more preferably no more than about 30 weight percent.

The polymer compositions of the invention will further comprise a nucleating agent. The term "nucleating agent", is defined to mean a material useful to control the particle size and process by which crystals are formed from liquids, supersaturated solutions or saturated vapors. Two classes of nucleating agents include: (1) preformed particles which are dispersed into the polymer composition Linder high shear; and (2) particles which are formed in situ in melt of the other components of the polymer composition, which particles crystallize at a higher temperature than the other components of the polymer composition, forming a fibrous network which serves as a nucleating site for the homogeneous polymer and wax.

Exemplary preformed particles which are dispersed into a polymer system under high shear include organophilic multi-layered particles. Such particles can be prepared from hydrophilic phyllosilicates by methods well known in the art. Illustrative of such materials are smectite clay minerals such as montmorillonite, nontronite, beidellite, volkonskoite, hectorite, saponite, sauconite, magadiite, kenyaite, and vermiculite. Other useful multi-layered particles include illite minerals such as ledikite and admixtures of illites with the clay minerals named above. Other useful multi-layered particles, particularly useful with anionic polymers, are the layered double hydroxides such as $Mg_6Al_{3.4}(OH)_{18.8}(CO_3)_{1.7}H_2O$ (see W. T. Reichle, J. Catal., Vol. 94, p. 547 (1985), which have positively charged layers and exchangeable anions in the interlayer spaces. Other multi-layered particles having little or no charge on the layers may be useful in this invention. Such materials include chlorides such as $ReCl_3$ and $FeOCl$; chalcogenides such as $TiS_2$, $MoS_2$, and $MoS_3$; cyanides such as $Ni(CN)_2$; and oxides such as $H_2Si_2O_5$, $V_5O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4\text{-}2H_2O$, $CaPO_4CH_3\text{-}H_2O$, $MnHAsO_4\text{-}H_2O$, and $Ag_6Mo_{10}O_{33}$.

The hydrophilic multi-layered particle can be rendered organophilic by exchange of sodium, potassium, or calcium cations with a suitable material such as a water-soluble polymer, a quaternary ammonium salt, an amphoteric surface-active agent, and a chlorine compound, or the like. Representative examples of exchangeable water-soluble polymers include water-soluble polymers of vinyl alcohol (for example, poly(vinyl alcohol)), polyalkylene glycols such as polyethylene glycol, water-soluble cellulosic polymers such as methyl cellulose and carboxymethyl cellulose, the polymers of ethylenically unsaturated carboxylic acids such as poly(acrylic acid) and their salts, and polyvinyl pyrrolidone.

Representative examples of the quaternary ammonium salts (cationic surface-active agents) which can be employed in this invention include the quaternary ammonium salts having octadecyl, hexadecyl, tetradecyl, or dodecyl groups; with preferred quaternary ammonium salts including dimethyl dihydrogenated tallow ammonium salt, octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, and ditetradecyl dimethyl ammonium salt.

Preferred organophilic multi-layered particles are those prepared by ion exchange of quaternary ammonium cations. A more preferred organophilic multi-layered material is a montmorillonite clay treated with a quaternary ammonium salt, most preferably dimethyl dihydrogenated tallow ammonium salt, commercially sold as Claytone™ HY (a trademark of Southern Clay Products).

The organophilic multi-layered particles may also be prepared by the exchange of the sodium, potassium, or calcium cations with an inorganic material, a polymeric substance obtained by hydrolyzing a polymerizable metallic alcoholate such as $Si(OR)_4$, $Al(OR)_3$, $Ge(OR)_4$, $Si(OC_2H_5)_4$, $Si(OCH_3)_4$, $Ge(OC_3H_7)$, or $Ge(OC_2H_5)_4$, either alone, or in any combination. Alternatively, the inorganic material can be a colloidal inorganic compound. Representative colloidal inorganic compounds which can be used include $SiO_2$, $Sb_2O_3$, $Fe_2O_3$, $Al_2O_3$, $TiO_2$, $ZrO_2$, and $SnO_2$, alone, or in any combination.

The organophilic multi-layered material may also be prepared through exchange of functionalized organosilane compounds, as disclosed in WO 93/11190, pp. 9–21, incorporated herein by reference.

Exemplary nucleating agents which are particles which are formed in situ in melt of the other components of the polymer composition include acetals, such as trinaphthylidene sorbitol, tri (4-methyl-1-naphthylidene) sorbitol, tri-(4-methyoxy-1-naphtylidene)sorbitol, and dibenzylidene zylitol. An example of these materials is 3,4,-dimethyl dibenzylidene sorbitol, which is available from Milliken Chemical, Inc. as Millad™ 3988, which is further available as a 10 weight percent mixture in 90 weight percent low density polyethylene as Millad™ 5L71-10, as well as Millad™ 3905P dibenzylidene sorbitol.

The concentration of the nucleating agent in the polymer composition of the invention will be in an amount effective to produce the desired improvement in elongation at break, and is application dependent, but is preferably not less than about 0.01 weight percent, more preferably not less than about 0.05 weight percent, even more preferably not less than about 0.1 weight percent, and most preferably not less than about 0.2 weight based on the total weight of the polymer composition; and preferably not greater than about 10 weight percent, more preferably not greater than about 5 weight percent, even more preferably not greater than about 1 weight percent, and most preferably no greater than about 0.5 weight percent of the total polymer composition.

The polymer composition of the invention will be characterized as having an elongation at break which is at least 50 percent greater, preferably at least about 100 percent greater, more preferably at least about 200 percent greater, even more preferably at least about 400 percent greater than comparative polymer compositions which lack the nucleating agent. As illustrated below in the examples, highly preferred polymer compositions are possible, which exhibit a percent elongation at break which is at least about 600 percent, an even at least about 700 percent greater than comparative compositions which lack the nucleating agent.

While the hot melt adhesives of the invention will preferably comprise at least one homogeneous ethylene polymer, they may, instead, or in addition, comprise any of a variety of traditional olefin polymers. The term olefin polymer is in part used herein to refer to $C_2$–$C_8$ α-olefin homopolymers or ethylene/α-olefin interpolymers prepared, for example, with a Ziegler Natta catalyst, low density polyethylene prepared, for example, in a high pressure reaction process. Olefin polymers prepared in a high pressure process are generally known as low density polyethylenes (LDPE) and are characterized by branched chains of polymerized monomer units pendant from the polymer backbone. LDPE polymers generally have a density between about 0.910 and about 0.935 g/cm³. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cm³, is typically a homopolymer of ethylene, and it contains relatively few branch chains relative to the various linear copolymers of ethylene and an α-olefin. HDPE is well known, commercially available in various grades, and may be used in this invention.

Olefin polymers which are linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (for example, 1-butene, 1-octene, etc.), that has sufficient α-olefin content to reduce the density of the copolymer to that of LDPE. When the copolymer contains even more α-olefin, the density will drop below about 0.91 g/cm³ and these copolymers are known as ultra low density polyethylene (ULDPE) or very low density polyethylene (VLDPE). The densities of these linear polymers generally range from about 0.87 to about 0.91 g/cm³.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al. Preferably, heterogeneous ethylene polymers are typically characterized as having molecular weight distributions, $M_w/M_n$, in the range of from about 3.5 to about 4.1. Relevant discussions of both of these classes of materials, and their methods of preparation are found in U.S. Pat. No. 4,950,541 and the patents to which it refers, each of which is incorporated herein by reference.

Likewise suitable as olefin polymers are ethylene polymers having at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof. Terpolymers of ethylene and these comonomers are also suitable. Ionomers, which are completely or partially neutralized copolymers of ethylene and the acids described above, are discussed in more detail in U.S. Pat. No. 3,264,272, incorporated herein by reference. In addition, terpolymers of ethylene/vinyl acetate/carbon monoxide or ethylene/methyl acrylate/carbon monoxide containing up to about 15 weight percent carbon monoxide may also be employed.

The ethylene to unsaturated carboxylic comonomer weight ratio is preferably from about 95:5 to about 40:60, more preferably from about 90:10 to about 45:50, and even more preferably from about 85:15 to about 60:40. The melt index ($I_2$ at 190° C.) of these modifying interpolymers of ethylene may range from about 0.1 to about 150, preferably from about 0.3 to about 50, and more preferably from about 0.7 to about 10 g/10 min.

Physical properties, principally elongation, are known to decline to lower levels when the ethylene copolymer melt index is above about 30 gl/10 min.

Suitable ethylene/unsaturated carboxylic acid, salt and ester interpolymers include ethylene/vinyl acetate (EVA) including, but not limited to, the stabilized EVA described in U.S. Pat. No. 5,096,955; ethylene/acrylic acid (EEA) and its ionomers; ethylene/methacrylic acid and its ionomers; ethylene/methyl acrylate; ethylene/ethyl acrylate; ethylene/isobutyl acrylate; ethylene/n-butyl acrylate; ethylene/isobutyl acrylate/methacrylic acid and its ionomers; ethylene/n-butyl acrylate/methacrylic acid and its ionomers, ethylene/isobutyl acrylate/acrylic acid and its ionomers; ethylene/n-butyl acrylate/acrylic acid and its ionomers; ethylene/methyl methacrylate; ethylene/vinyl acetate/methacrylic acid and its ionomers; ethylene/vinyl acetate/acrylic acid and its ionomers; ethylene/vinyl acetate/carbon monoxide; ethylene/methacrylate/carbon monoxide; ethylene/n-butyl acrylate/carbon monoxide; ethylene/isobutyl acrylate/carbon monoxide; ethylene/vinyl acetate/monoethyl maleate; and ethylene/methyl acrylate/monoethyl maleate. Particularly suitable copolymers are EVA; EAA; ethylene/methyl acrylate; ethylene/isobutyl acrylate; and ethylene/methyl methacrylate copolymers and mixtures thereof. Certain properties, such as tensile elongation, are taught to be improved by certain combinations of these ethylene interpolymers, as described in U.S. Pat. No. 4,379,190. The procedures for making these ethylene interpolymers are well known in the art and many are commercially available.

When an ethylene interpolymer is used in additional to a homogeneous ethylene polymer, the ethylene interpolymer will typically be added in an amount of up to about 25 percent by weight to increase the cohesive strength, improve the sprayability, modify the open time, increase the flexibility, etc. This modifying polymer may be any compatible elastomer, such as a thermoplastic block copolymer, a polyamide, an amorphous or crystalline polyolefin such as polypropylene, polybutylene or polyethylene wherein M, is greater than 3000; an ethylenic copolymer such as ethylene-vinyl acetate (EVA), ethylene-methyl acrylate, or a mixture thereof. Surprisingly, the homogeneous ethylene/α-olefin interpolymers are also compatible with polyamides, resulting in plasticizer resistant pressure sensitive adhesives. The modifying polymer will typically be used in a relatively low concentration, so as not to detract from the improved properties of the homogeneous ethylene/α-olefin interpolymer. A preferred modifying polymer for increasing the open time and heat resistance is a polybutene-1 copolymer such as Duraflex™ 8910 (Shell).

In the embodiment of the invention which provides a hot melt adhesive formulation, such hot melt adhesive formulation will preferably comprise a homogeneous ethylene polymer, a wax, a nucleating agent, and a tackifier.

In the inventive hot melt adhesive formulations, the homogeneous ethylene polymer, as described above, will preferably be provided in an amount of at least about 5 weight percent, preferably at least about 10 weight percent, more preferably at least about 20 weight percent, more preferably at least about 50 weight percent, and most preferably at least about 70 weight percent; typically less than about 99 weight percent, preferably less than about 95 weight percent, more preferably less than about 90 weight percent, and most preferably less than about 80 weight percent.

In the inventive hot melt adhesive formulations, the wax will typically be provided in an amount of at least about 1 weight percent, preferably at least about 5 weight percent, more preferably at least about 10 weight percent, and most preferably at least about 20 weight percent. The wax will typically be provided to the hot melt adhesive formulation in an amount of no more than about 40 weight percent, preferably no more than about 35 weight percent, more preferably no more than about 30 weight percent.

In the inventive hot melt adhesive formulations, the nucleating agent will typically be provided in an amount of not less than about 0.01 weight percent, more preferably not less than about 0.05 weight percent, even more preferably not less than about 0.1 weight percent, and most preferably not less than about 0.2 weight based on the total weight of the hot melt adhesive formulation; and preferably not greater than about 10 weight percent, more preferably not greater than about 5 weight percent, even more preferably not greater than about 1 weight percent, and most preferably no greater than about 0.5 weight percent of the hot melt adhesive formulation.

In the inventive hot melt adhesive formulations, the tackifier will typically be provided in an amount of at least about 1 weight percent, more preferably at least about 5 weight percent, and most preferably at least about 10 weight percent; and typically no more than about 80 weight percent, preferably no more than about 60 weight percent, more preferably no more than about 45 weight percent of the hot melt adhesive formulation.

In general terms, the tackifiers useful in the hot melt adhesives of the invention comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the adhesives of this invention.

Representative examples of useful hydrocarbon resins includes alpha-methyl styrene resins, branched and unbranched $C_5$ resins, $C_9$ resins, $C_{10}$ resins, as well as styrenic and hydrogenated modifications of such. Tackifiers range from being a liquid at 37° C. to having a ring and ball softening point of about 135° C. Solid tackifying resins with a softening point greater than about 100° C., more preferably with a softening point greater than about 130° C. are particularly useful to improve the cohesive strength of the adhesives of the present invention.

For the adhesives of the invention, the preferred tackifying resin is predominantly aliphatic. However, tackifying resins with increasing aromatic character are also useful, particularly when a second tackifier or mutually compatible plasticizer is employed.

Exemplary tackifiers include Eastotac® H-100, H-115 and H-130 from Eastman Chemical Co. in Kingsport, Tenn. which are partially hydrogenated cycloaliphatic petroleum hydrocarbon resins with softening points of 100° C., 115° C. and 130° C., respectively. These are available in the E grade, the R grade, the L grade and the W grade indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. There is also an Eastotac® H-142R from Eastman Chemical Co. which has a softening point of about 140° C. Other useful tackifying resins include Escorez®D 5300 and 5400, partially hydrogenated cycloaliphatic petroleum hydrocarbon resins, and Escorez® 5600, a partially hydrogenated aromatic modified petroleum hydrocarbon resin all available from Exxon Chemical Co. in Houston, Tex.; Wingtack® Extra which is an aliphatic, aromatic petroleum hydrocarbon resin available from Goodyear Chemical Co. in Akron, Ohio; Hercolite(® 2100, a partially hydrogenated cycloaliphatic petroleum hydrocarbon resin available from Hercules, Inc. in Wilmington, Del.; and Zonatac® 105 and 501 Lite, which are styrenated terpene resins made from d-limonene and available from Arizona Chemical Co. in Panama City, Fla.

There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac® 1103, a pentaerythritol rosin ester available from Arizona Chemical Co., Unitac® R-100 Lite, a pentaerythritol rosin ester from Union Camp in Wayne, N.J., Permalyn® 305, a erythritol modified wood rosin available from Hercules and Foral 105 which is a highly hydrogenated pentaerythritol rosin ester also available from Hercules. Sylvatac® R-85 and 295 are 85° C. and 95° C. melt point rosin acids available from Arizona Chemical Co. and Foral AX is a 70° C. melt point hydrogenated rosin acid available from Hercules, Inc. Nirez V-2040 is a phenolic modified terpene resin available from Arizona Chemical Co.

The hot melt adhesive of the invention may optionally comprise a plasticizer. When a plasticizer is employed, it will typically be provided to the hot melt adhesive formulation in an amount of at least about 1 weight percent, preferably at least about 5 weight percent, and more preferably at least about 10 weight percent; and typically in an amount of no more than about 30 weight percent, preferably no more than about 25 weight percent, and most preferably no more than about 20 weight percent of the hot melt adhesive formulation.

A plasticizer is broadly defined as a typically organic composition that can be added to thermoplastics, rubbers and other resins to improve extrudability, flexibility, workability, or stretchability. The plasticizer may be either a liquid or a solid at ambient temperature. Exemplary liquid plasticizers include hydrocarbon oils, polybutene, liquid tackifying resins, and liquid elastomers. Plasticizer oils are primarily hydrocarbon oils which are low in aromatic content and which are paraffinic or napthenic in character. Plasticizer oils are preferably low in volatility, transparent and have as little color and odor as possible. The use of plasticizers in this invention also contemplates the use of olefin oligomers, low molecular weight polymers, vegetable oils and their derivatives and similar plasticizing liquids.

When a solid plasticizing agent is employed, it will preferably have a softening point above about 60° C. It is believed that by combining the homogeneous ethylene/α-olefin interpolymer with a suitable tackifying resin and a solid plasticizer such as a cyclohexane dimethanol dibenzoate plasticizer, the resulting adhesive composition may be applied at temperatures below about 120° C., preferably below about 100° C. Although a 1,4-cyclohexane dimethanol dibenzoate compound commercially available from Velsicol under the trade name Benzoflex™ 352 is exemplified, any solid plasticizer that will subsequently recrystallize in the compounded thermoplastic composition is suitable. Other plasticizers that may be suitable for this purpose are described in EP 0422 108 B1 and EP 0 410 412 B1, both assigned to H.B. Fuller Company.

In the embodiments of the invention which further comprise a plasticizer, preferably a solid plasticizer will be employed.

The hot melt adhesives of the invention will be characterized as having a percent elongation at break which is at least about 25 percent greater, preferably at least about 50 percent greater, and more preferably at least about 100 percent greater than a comparative hot melt adhesive which lacks the nucleating agent.

Additives such as antioxidants (for example, hindered phenolics (for example, Irganox™ 1010, Irganox™ 1010), phosphites (for example, Irgafos™ 168)), cling additives (for example, polyisobutylene), antiblock additives, colorants, pigments, extender oils, fillers, and tackifiers can also be included in the present compositions, to the extent that they do not detrimentally affect the elongation properties which are characteristic of the polymer compositions of the invention. In the case of antioxidants, cling additives, antiblock additives, colorants, etc., such optional components will typically be present in the polymer compositions of the invention in an amount less than about 5 weight percent, preferably less than about 3 weight percent, more preferably less than about I weight percent. In the case of extender oils and tackifiers, such components may be provided in substantially greater amounts. Except as otherwise provided above, in the case of the hot melt adhesive formulations of the invention which are discussed in more detail above, when it is desirable to include such components, they will typically be provided in an amount greater than about 5 weight percent, preferably at least about 10 weight percent, more preferably at least about 20 weight percent: preferably no more than about 70 weight percent, more preferably no more than about 60 weight percent.

Likewise, the compositions of the invention may further optionally comprise other polymeric components, including but not limited to polypropylene, styrene-butadiene block copolymers, and conventional polyolefins (such as, for instance, linear low density polyethylene, low density polyethylene, and ethylene vinyl acetate copolymers).

The compositions of the present invention are compounded by any convenient method, including dry blending the individual components and subsequently melt mixing, either directly in the extruder used to make the finished article, or by pre-melt mixing in a separate extruder or mixer such as, for example, a Haake unit or a Banbury mixer.

The polymer compositions of the invention will find utility in applications requiring high elongation at break, while maintaining a high onset of crystallization temperature, such as in the high-speed coating of fabrics, carpet backing, floor tile and sheeting, and adhesives.

EXAMPLES

Preparation of Polymer Compositions

The ingredients utilized in the polymer compositions of the invention and of the comparative examples are set forth in the following Table One. The homogeneous ethylene polymers are prepared in accordance with the procedures of U.S. Pat. Nos. 5,272,236 and 5,278,272, and in accordance with the procedures for preparing ultra-low molecular weight ethylene polymers and homogeneous waxes set forth in WO/97/26287, each of which is incorporated herein by reference.

The compositions of the examples and comparative examples were prepared in accordance with the following procedure. The homogeneous polymer was added in the amount indicated in the following Table Two to a Haake mixer which was preheated to 130° C. and which was operated at 20 revolutions per minute. After the polymer melted, the mixing speed was increased to 200 revolutions per minute, and the polymer was mixed for 2 minutes. The nucleating agent was then added in the amount indicated in Table Two, and the resultant material was mixed for two minutes. The wax was added in the amount indicated in Table Two, and the resultant materials was mixed for two minutes. After cooling to 95° C., the sample was removed from the mixture.

Plaque Preparation

Plaque-shaped samples were made by compression forming using the following procedure. Fifteen (15) grams of the sample indicated in Table Two was placed between two polytetrafluoroethylene coated-fiber glass cloths, and was pressed at 200 psig (1.38 MPa) for 2 to 3 minutes at a temperature of 130° C. The pressure was increased to 20,000 psig (138 MPa), and the sample was maintained at this pressure for 2 to 3 minutes. The sample was cooled to 25° C., and was allowed to equilibrate for at least 12 hours. In accordance with ASTM D-1708, a punch press equipped with a micro-tensile die was used to cut dumbbell-shaped micro-tensile specimens from the plaques, which were evaluated for elongation at break, break stress, and peak stress. The nominal stress-strain diagram for each sample was determined using an Instron™ 4507 Materials Testing System (available from Instron Corporation). The crosshead speed was 4 inches/minute (10 cm/minute).

TABLE ONE

Ingredients

| Identification | Descriptive Information | Company of Origin |
|---|---|---|
| Polymer A | Homogeneous ethylene/1-octene interpolymer having a density of 0.870 g/cm$^3$ and an $I_2$ of 70 g/10 min. (additives include 1250 ppm calcium stearate, 800 ppm PEPQ (tetrakis(2,4-di-t-butylphenyl)-4,4'-biphenylene diphosphonite) (available from Clariant Corporation), and 2000 ppm Irganox ™ 1010) | The Dow Chemical Company |
| Polymer B | Homogeneous ethylene/1-octene interpolymer having a density of 0.890 g/cm$^3$ and an $I_2$ of 2200 g/10 min. (melt viscosity at 350° F. of 5000 centipoise) (additives include 2000 ppm Irganox ™ 1010) | The Dow Chemical Company |
| Polymer C | Homogeneous ethylene/1-octene interpolymer having a density of 0.870 g/cm$^3$ and an $I_2$ of 190 g/10 min. (additives include 2000 ppm Irganox ™ 1010) | The Dow Chemical Company |
| Polymer D | Homogeneous ethylene/1-octene interpolymer having a density of 0.860 g/cm$^3$ and an $I_2$ of 10 g/10 min. (additives include 2000 ppm Irganox ™ 1010). | The Dow Chemical Company |
| Polymer E | Homogeneous ethylene/1-octene interpolymer having a density of 0.880 g/cm$^3$ and an $I_2$ of 1000 g/10 min. | The Dow Chemical Company |
| Wax A | R-7152 fully refined paraffin wax having a melting point of 151° F. | Moore and Munger Marketing, Inc. |
| Wax B | Bareco C-1035 Fischer Tropsch wax having a melting point of 205° F. | Bareco, Inc. |
| Wax C | Bareco PX-100 Fischer Tropsch Wax | Bareco, Inc. |
| Wax D | Paraflint RT Fischer Tropsch wax having a congealing point of 208° F. | Moore and Munger Marketing, Inc. |
| Wax E | Paraflint C-80 Fischer Tropsch wax having a congealing point of 176° F. | Moore and Munger Marketing, Inc. |
| Wax F | 180 microcrystalline wax | Shell Chemical Company |
| Nucleating Agent A | Millad ™ 5L71-10 Concentrate (10 weight percent Millad ™ 3988 3,4-dimethyl dibenzylidene sorbitol is dispersed in 90 weight percent low density polyethylene, and is provided at 92 weight percent in conjunction with 4 weight percent Irganox ™ 1076 and 4 weight percent Irgafos ™ 168) | Milliken Chemicals |
| Nucleating Agent B | Millad ™ 3905 (3,4-dimethyl dibenzylidene sorbitol) | Milliken Chemicals |
| Tackifier A | Escorez 5615 | Exxon Chemical Company |

TABLE TWO

Polymer Composition

|  | Ex. 1 | Comp. Ex. 2 | Ex. 3 | Comp. Ex. 4 | Ex. 5 | Comp. Ex. 6 | Ex. 7 | Comp. Ex. 8 | Ex. 9 | Comp. Ex. 10 |
|---|---|---|---|---|---|---|---|---|---|---|
| Polymer A | 52.3 | 52.6 | 52.3 | 52.6 | 52.3 | 52.6 | 52.3 | 52.6 | 52.3 | 52.6 |
| Polymer B | 22.4 | 22.4 | 22.4 | 22.4 | 22.4 | 22.4 | 22.4 | 22.4 | 22.4 | 22.4 |
| Wax A |  |  |  |  |  |  | 25.0 | 25.0 |  |  |
| Wax B | 25.0 | 25.0 |  |  |  |  |  |  |  |  |
| Wax C |  |  | 25.0 | 25.0 |  |  |  |  |  |  |
| Wax D |  |  |  |  | 25.0 | 25.0 |  |  |  |  |
| Wax E |  |  |  |  |  |  |  |  | 25.0 | 25.0 |
| Nucleating Agent A | 0.3 | 0 | 0.3 | 0 | 0.3 | 0 | 0.3 | 0 | 0.3 | 0 |

Figure 1:
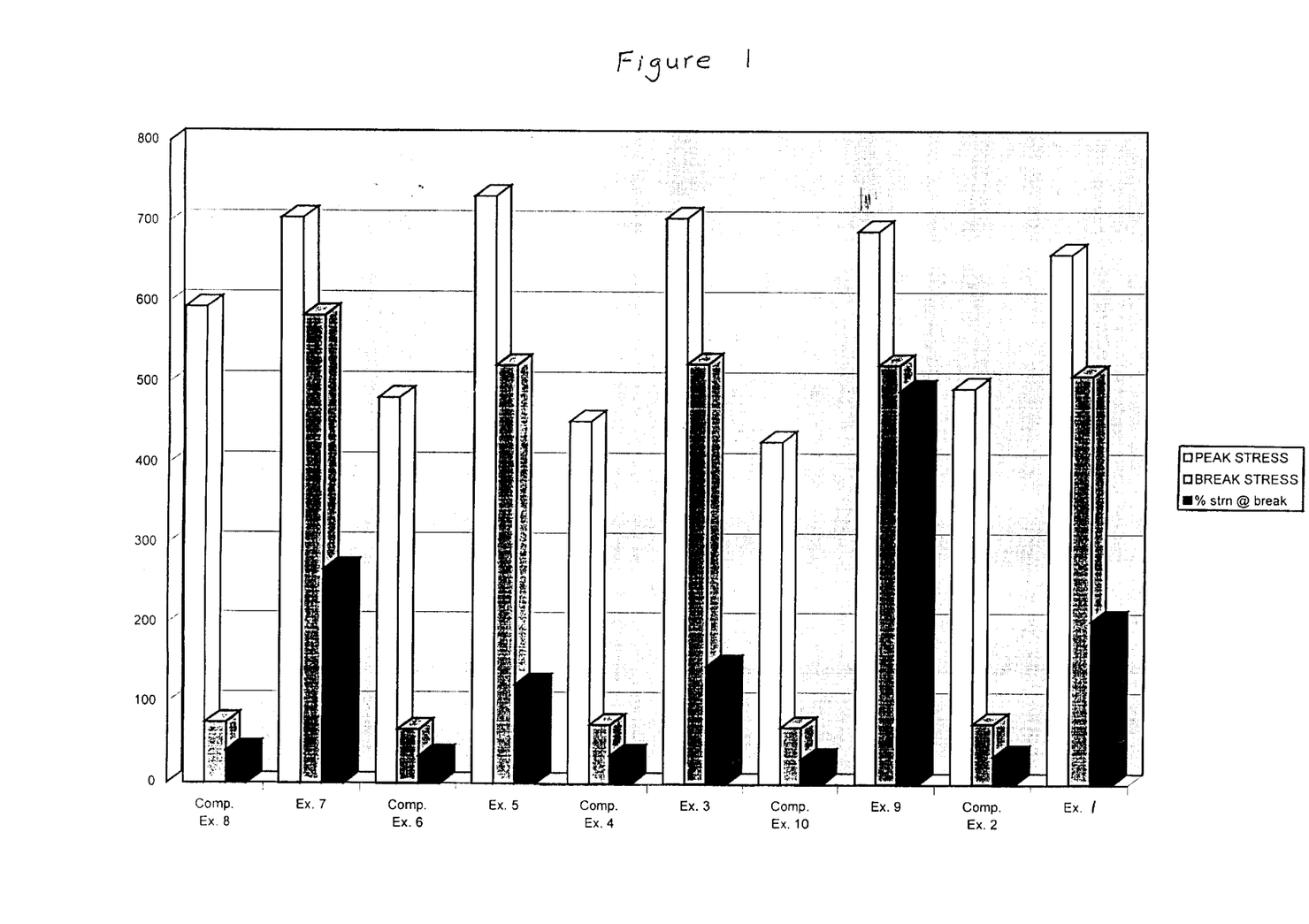
FIG. 1 is a bar chart representation of the elongation properties of polymer compositions of the invention and comparative compositions lacking a nucleating agent The polymer compositions of the invention comprise at least one homogeneous ethylene/α-olefin interpolymer which is an interpolymer of ethylene and at least one C$_3$–C$_{20}$ (α-olefin. The term "interpolymer" is used herein to indicate a copolymer, or a terpolymer, or a higher order polymer. That is, at least one other comonomer is polymerized with ethylene to make the interpolymer.

The percent strain at break, peak stress, and break stress of the compositions of Examples and Comparative Examples 1–10 are set forth in FIG. 1. As illustrated therein, the subject invention provides compositions exhibiting at least about four times greater percent strain at break (in the case of Examples 1, 3, 6, 7, and 9), at least about six times greater percent strain at break (in the case of Examples 1, 7, and 9), and at least about fifteen times greater percent strain at break (in the case of Example 9), than comparative compositions lacking the nucleating agent.

As further illustrated in FIG. 1, the subject invention provides compositions exhibiting a percent strain at break which is at least about 120 percent (in the case of Examples 1, 3, 5, 7, and 9), preferably at least about 200 percent (in the case of Examples 1, 7, and 9), and more preferably at least about 400 percent (in the case of Example 9).

As further illustrated in FIG. 1, the subject invention provides compositions exhibiting a break stress which is at least about 7 times greater (in the case of Examples 1, 3, 5, 7, and 9) than that of the comparative compositions lacking the nucleating agents. As further illustrated, the subject invention provides compositions exhibiting a break stress of at least about 500 psi (3.4 MPa) (in the case of Examples 1, 3, 5, 7, and 9), with Example 7 exhibiting a break stress of nearly 600 psi (4.1 MPa).

As further illustrated in FIG. 1, the compositions of the invention exhibit a peak stress which is at least about 10 percent greater (in the case of Examples 1, 3, 5, 7, and 9), preferably at least about 20 percent greater (in the case of Examples 1, 3, 5, and 9), and most preferably at least about 30 percent greater (in the case of Examples 3 and 9) than that of comparative compositions lacking the nucleating agents. As further illustrated, the subject invention provides compositions exhibiting a peak stress which is at least about 650 psi (4.5 MPa) (in the case of Examples 1, 3, 5, 7, and 9).

Formulations Containing a Single Homoteneous Ethylene Polymer

Example 11 is prepared in accordance with the procedure described with respect to Examples and Comparative Examples 1–1 0. Example 11 contains 69.85 weight percent Polymer C, 29.85 weight percent Wax A, and 0.3 weight percent Nucleating Agent A. Comparative Example 12 contains 70 weight percent Polymer C and 30 weight percent Wax A. Example 11 exhibits a percent elongation at break, peak stress, and break stress which is improved over that of Comparative Example 12.

Preparation of Hot Melt Adhesive Formulations

The hot melt adhesive formulations were blended with a Haake mixer using the following procedure. First, the mixer was heated to 130° C. The mixer was started, and, when it achieved a speed of 20 revolutions per minute, the polymer portion of the formulation was added. After the polymer had melted, the speed was raised to 200 revolutions per minute, and the molten polymer was mixed for two minutes. The nucleating agent (when used) was added, and the mixture was mixed for two minutes. The wax and tackifier were then added, and the formulation was mixed for two minutes. The formulation was cooled to 95° C., and was removed from the mixer. The formulations prepared are set forth in the following Table Three.

TABLE THREE

| Ingredient | HMA-A (weight percent) | Comparative HMA-B (weight percent) |
| --- | --- | --- |
| Polymer D | 17.5 | 16.0 |
| Polymer E | 17.5 | 16.0 |
| Nucleating Agent B | 3.0 | 0 |
| Wax F | 25.0 | 25.0 |
| Tackifier A | 39.5 | 39.5 |

HMA-A is characterized as having a percent strain at break which is at least about 800 percent, as compared to the Comparative HMA-B which has a percent strain at break of about 420 percent. HMA-A has a yield stress which is within 10 percent of the yield stress of Comparative HNMA-B. HMA-A further has a break stress which is within 10 percent of the break stress of Comparative HMA-B.

Preparation of Homogeneous Ethylene Polymers, Ultralow Molecular Weight Ethylene Polymers. and Homogeneous Waxes for Use in the Polymer Compositions of the Invention The following provides procedures and conditions useful to make homogeneous ethylene polymers, ultra-low molecular weight ethylene polymers and homogeneous waxes for use in the polymer compositions of the invention:

Catalyst Preparation One

Part 1: Preparation of $TiCl_3(DME)_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5 L). In the drybox, 700 g of $TiCl_3$ was weighed into an equalizing powder addition funnel; the funnel was capped, removed from the drybox, and put on the reaction kettle in place of the stopper. The $TiCl_3$ was added over about 10 minutes with stirring. After the addition was completed, additional DME was used to wash the rest of the $TiCl_3$ into the flask. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The $TiCl_3(DME)_{1.5}$ was left in R-1 as a pale blue solid.

Part 2: Preparation of $[(Me_4C_5)SiMe_2N\text{-}t\text{-}Bu][MgCl]_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 4.5 L of toluene, 1.14 kg of $(Me_4C_5H)SiMe_2NH\text{-}t\text{-}Bu$, and 3.46 kg of 2 M i-PrMgCl in $Et_2O$. The mixture was then heated, and the ether allowed to boil off into a trap cooled to −78° C. After four hours, the temperature of the mixture had reached 75° C. At the end of this time, the heater was turned off and DME was added to the hot, stirring solution, resulting in the formation of a white solid. The solution was allowed to cool to room temperature, the material was allowed to settle, and the supernatant was decanted from the solid. The [(Me$_4$C$_5$)SiMe$_2$N-t-Bu][MgCl]$_2$ was left in R-2 as an off-white solid.

Part 3: Preparation of ($\eta^5$-Me$_4$C$_5$)SiMe$_2$N-t-Bu]TiMe$_2$

The materials in R-1 and R-2 were slurried in DME (3 L of DME in R-1 and 5 L in R-2). The contents of R-1 were transferred to R-2 using a transfer tube connected to the bottom valve of the 10 L flask and one of the head openings in the 30 L flask. The remaining material in R-1 was washed over using additional DME.

The mixture darkened quickly to a deep red/brown color, and the temperature in R-2 rose from 21° C. to 32 ° C. After 20 minutes, 160 mL of CH$_2$Cl$_2$ was added through a dropping funnel, resulting in a color change to green/brown. This was followed by the addition of 3.46 kg of 3 M MeMgCl in THF, which caused a temperature increase from 22° C. to 52° C. The mixture was stirred for 30 minutes, then 6 L of solvent was removed under vacuum. Isopar E (6 L) was added to the flask. This vacuum/solvent addition cycle was repeated, with 4 L of solvent removed and 5 L of Isopar E added. In the final vacuum step, an additional 1.2 L of solvent was removed. The material was allowed to settle overnight, then the liquid layer decanted into another 30 L glass kettle (R-3). The solvent in R-3 was removed under vacuum to leave a brown solid, which was re-extracted with Isopar E; this material was transferred into a storage cylinder. Analysis indicated that the solution (17.23 L) was 0.1534 M in titanium; this is equal to 2.644 moles of [($\eta^5$-Me$_4$C$_5$)SiMe$_2$N-t-Bu]TiMe$_2$). The remaining solids in R-2 were further extracted with Isopar E, the solution was transferred to R-3, then dried under vacuum and re-extracted with Isopar E. This solution was transferred to storage bottles; analysis indicated a concentration of 0.1403 M titanium and a volume of 4.3 L (0.6032 moles [($\eta^5$-Me$_4$C$_5$)SiMe$_2$N-t-Bu]TiMe$_2$). This gives an overall yield of 3.2469 moles of [($\eta^5$-Me$_4$C$_5$)SiMe$_2$N-t-Bu]TiMe$_2$, or 1063 This is a 72 percent yield overall based on the titanium added as TiCl$_3$.

Catalyst Preparation Two

Part 1: Preparation of TiCl$_3$(DME)$_{1.5}$

The apparatus (referred to as R-1) was set-up in the hood and purged with nitrogen; it consisted of a 10 L lass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with (,as inlet/outlet, an inlet for solvent, a thermocouple, and a stopper. Dry, deoxygenated dimethoxyethane (DME) was added to the flask (approximately 5.2 L). In the drybox, 300 g of TiCl$_3$ was weighed into an equalizing powder addition funnel, the funnel was capped, removed from the drybox, and put on the reaction kettle in place of the stopper. The TiCl$_3$ was added over about 10 minutes with stirring,. After the addition was completed, additional DME was is used to wash the rest of the TiCl$_3$ into the flask. This process was then repeated with 325 g of additional TiCl$_3$, giving a total of 625 g. The addition funnel was replaced with a stopper, and the mixture heated to reflux. The color changed from purplc to pale blue. The mixture was heated for about 5 hours, cooled to room temperature, the solid was allowed to settle, and the supernatant was decanted from the solid. The TiCl$_3$(DME)$_{1.5}$ was left in R-1 as a pale blue solid.

Part 2: Preparation of [(Me$_4$C$_5$)Me$_2$N-t-Bu][MgCl]$_2$

The apparatus (referred to as R-2) was set-up as described for R-1, except that flask size was 30 L.

The head was equipped with seven necks; stirrer in the center neck, and the outer necks containing condenser topped with nitroen inlet/outlet, vacuum adapter, reagent addition tube , thermocouple, and stoppers. The flask was loaded with 7 L of toluene , 3.09 kg of 2.17 M i-PrMgCl in Et$_2$O, 250 ml, of THF, and 1.03 kg of (Me$_4$C$_5$H)SiMe$_2$NH-t-Bu. The m ixture w as then heated, and the ether a llowed to boil off into a trap cooled to −78° C. After three hours, the temperature of the mixture had reached 80° C., at which time a white precipitate formed. The temperature was then increased to 90° C. over 30 minutes and held at this temperature for 2 hours. At the end of this time, th e heater was turned off and 2 L of DME was added to the hot, stirring solution, resulting in the formation of additional precipitate. The solution was allowed to cool to room temperature, the material was allowed to settle, and the supernatant was decanted from the solid. An additional wash was done by adding toluene, stirring for several minutes, allowing the solids to settle, and decanting the toluene solution. The [(Me$_4$C$_5$)SiMe$_2$N-t-Bu][MgCl]$_2$ was left in R-2 as an off-white solid.

Part 3: Preparation of [($\eta$5-Me$_4$C)SiMe$_2$N-t-Bu]Ti($\eta^4$-1.3-pentadiene)

The materials in R-1 and R-2 were slurried in DME (the total volumes of the mixtures were approx. 5 L in R-1 and 12 L in R-2). The contents of R-2 were transferred to R-2 using a transfer tube connected to the bottom valve of the 10 L flask and one of the head openings in the 30 L flask. The remaining material in R-1 was washed over using additional DME. The mixture darkened quickly to a deep red/brown color. After 15 minutes, 1050 mL of 1,3-pentadiene and 2.60 kg of 2.03 M n-BuMgCl in THF were added simultaneously. The maximum temperature reached in the flask during this addition was 53° C. The mixture was stirred for 2 hours, then approx. 11 L of solvent was removed under vacuum. Hexane was then added to the flask to a total volume of 22 L. The material was allowed to settle, and the liquid layer (12 L) was decanted into another 30 L glass kettle (R-3). An additional 15 liters of product solution was collected by adding hexane to R-2, stirring for 50 minutes, again allowing to settle, and decanting. This material was combined with the first extract in R-3. The solvent in R-3 was removed under vacuum to leave a red/black solid, which was then extracted with toluene. This material was transferred into a storage cylinder. Analysis indicated that the solution (11.75 L) was 0.255 M in titanium; this is equal to 3.0 moles of [($\eta$5-Me$_4$C$_5$)SiMe$_2$N-t-Bu]Ti($\eta$4-1,3-pentadiene) or 1095 g. This is a 74 percent yield based on the titanium added as TiCl$_3$.

Preparation of Polymers A–E

Polymer A was produced in accordance with the procedure of U.S. Pat. No. 5,272,236 and 5,278,272. The polymer products of Examples B–E (the polymer components, in the case of Polymer D, which was a melt blend of two polymer components), were prepared in a solution polymerization process using ISOPAR E as a solvent, using ethylene and octene as comonomers, and using the reactor conditions indicated in the following Table Four. In Example A, the catalyst employed was that of Catalyst Description One, while in each of Examples B–E, the catalyst employed was the catalyst of Catalyst Description Two. In each of preparations A–E, the cocatalyst was tris(pentafluorophenyl) borane, available as a 3 weight percent solution in Isopar™-E mixed hydrocarbon, from Boulder Scientific, and aluminum was provided in the form of a solution of modified methylalumoxane (MMAO Type 3A) in heptane, which is available at a 2 weight percent aluminum concentration from Akzo Nobel Chemical Inc. Each of Examples B–E utilized 35 ppm deionized water as a catalyst kill.

In the case of Polymer B, the octene flow was 2.3 lbs/hr (5.06 kg/hr), the hydrogen flow was 60 SCCM, and the solvent flow was 19.06 lbs/hr (41.93 kg/hr).

TABLE FOUR

|  | B | C | D (First Component)* | D (Second Component)* |
|---|---|---|---|---|
| Ethylene feed (kg/hr) | 44.4 | 47.6 | 45.4 | 47.6 |
| Comonomer: olefin ratio (mole percent) |  | 21 | 19.5 | 18.1 |
| Hydrogen: ethylene ratio (mole percent) |  | 0.182 | 0.061 | 0.443 |
| Diluent: ethylene ratio (weight basis) |  | 6 | 6 | 6 |
| Catalyst metal concentration (ppm) | 4 | 40 | 70 | 66 |
| Catalyst flow rate (kg/hr) | 0.713 kg/hr | 1.12 | 0.318 | 0.585 |
| Co catalyst concentration (ppm) | 87.9 | 3000 | 2070 | 1990 |
| Co catalyst flow rate (kg/hr) | 1.04 kg/hr | 0.561 | 0.342 | 0.827 |
| Aluminum concentration (ppm) | 9.77 | 400 | 215 | 170 |
| Aluminum flow rate (kg/hr) | 0.99 kg/hr | 0.318 | 0.290 | 0.826 |
| Reactor temperature (° C.) | 110.4 | 120 | 91 | 120 |
| Reactor pressure (MPa) | 3.3 | 3.7 | 3.7 | 3.7 |
| Ethylene concentration in reactor exit stream (weight percent) |  | 1.68 | 1.22 | 1.45 |
| Polymer density (g/cm$^3$) | 0.890 | 0.8721 | 0.8620 | 0.8789 |
| Polynaer melt viscosity at 350° F. (177° C.) (centipoise) | 4900 | 50,448 | 746,660 | 8,177 |
| Polymer melt index ($I_2$ at 190° C.) | 1600 | 200 | 9.7 | 1000 |
| Polymer Mw | 15600 | 31200 | 70900 | 18000 |
| Polymer Mn | 8700 | 17300 | 35800 | 10000 |
| Polymer Mw/Mn | 1.793 | 1.803 | 1.98 | 1.88 |

*Polymer D is a melt blend formed from 50 weight percent of each of the first and second components identified.

Preparation of Polymers A1–R1

The polymer products of Examples A1–R1 are produced in a solution polymerization process using a continuously stirred reactor. Additives (for example, antioxidants, pigments, etc.) can be incorporated into the interpolymer products either during the pelletization step or after manufacture, with a subsequent re-extrusion. Examples A1–I1 were each stabilized with 1250 ppm calcium stearate, 500 ppm Irganox™ 1076 hindered polyphenol stabilizer (available from Ciba-Geigy Corporation), and 800 ppm PEPQ (tetrakis(2,4-di-t-butylphenyl)-4,4'-biphenylene diphosphonite) (available from Clariant Corporation). Examples J1–R1 were each stabilized with 500 ppm Irganox™ 1076, 800 ppm PEPQ, and 100 ppm water (as a catalyst kill agent).

The ethylene and the hydrogen were combined into one stream before being introduced into the diluent mixture, a mixture of $C_8$–$C_{10}$ saturated hydrocarbons, for example, Isopar-E hydrocarbon mixture (available from Exxon Chemical Company) and the comonomer. In Examples A1–I1, the comonomer was 1-octene; in Examples Q1 and R1, the comonomer was I-butene; and Example PI had no comonomer. The reactor feed mixture was continuously injected into the reactor.

The metal complex and cocatalysts were combined into a single stream and were also continuously injected into the reactor. For Examples A1–I1, the catalyst was as prepared in Catalyst Description One set forth above. For Examples J1–R1, the catalyst was as prepared in Catalyst Description Two set forth above. For Examples A1–R1, the co-catalyst was tris(pentafluorophenyl)borane, available as a 3 weight percent solution in Isopar™-E mixed hydrocarbon, from Boulder Scientific. Aluminum was provided in the form of a solution of modified methylalumoxane (MMAO Type 3A) in heptane, which is available at a 2 weight percent aluminum concentration from Akzo Nobel Chemical Inc.

Sufficient residence time was allowed for the metal complex and cocatalyst to react prior to introduction into the polymerization reactor. For the polymerization reactions of Examples A1–R1, the reactor pressure was held constant at about 475 psig (3380 kPa). Ethylene content of the reactor, in each of Examples A1–R1, after reaching steady state, was maintained at the conditions specified in Table Five.

After polymerization, the reactor exit stream is introduced into a separator where the molten polymer is separated from the unreacted comonomer(s), unreacted ethylene, unreacted hydrogen, and diluent mixture stream. The molten polymer is subsequently strand chopped or pelletized, and, after being cooled in a water bath or pelletizer, the solid pellets are collected. Table Five describes the polymerization conditions and the resultant polymer properties.

TABLE FIVE

|  | A1 | B1 | C1 | D1 | E1 | F1 | G1 | H1 | I1 | J1 |
|---|---|---|---|---|---|---|---|---|---|---|
| Ethylene feed (lb/hr) | 2.0 | 2.0 | 2.0 | 2.0 | 2.0 | 2.0 | 3.0 | 3.0 | 3.0 | 3.0 |
| (kg/hr) | (0.91) | (0.91) | (0.91) | (0.91) | (0.91) | (0.91) | (1.4) | (1.4) | (1.4) | (1.4) |
| Comonomer: olefin ratio (mole percent) | 18.00 | 18.10 | 12.40 | 12.50 | 12.50 | 8.50 | 4.40 | 0.40 | 0.40 | 11.80 |

TABLE FIVE-continued

| | | | | | | | | | | |
|---|---|---|---|---|---|---|---|---|---|---|
| Hydrogen: ethylene ratio (mole percent) | 0.00 | 1.22 | 0.26 | 0.48 | 1.26 | 0.66 | 0.68 | 0.72 | 1.60 | 0.34 |
| Diluent: ethylene ratio (weight basis) | 10.20 | 9.80 | 10.60 | 11.10 | 11.10 | 9.30 | 5.90 | 5.90 | 5.90 | 9.99 |
| Catalyst metal concentration (ppm) | 4 | 4 | 4 | 4 | 4 | 2 | 5 | 5 | 5 | 3 |
| Catalyst flow rate (lb/hr) (kg/hr) | 0.280 (0.127) | 0.313 (0.142) | 0.272 (0.123) | 0.316 (0.143) | 0.428 (0.194) | 0.386 (0.175) | 0.417 (0.189) | 0.441 (0.200) | 0.626 (0.284) | 0.449 (0.203) |
| Co-catalyst concentration (ppm) | 88 | 88 | 88 | 88 | 88 | 44 | 353 | 353 | 353 | 88 |
| Co-catalyst flow rate (lb/hr) (kg/hr) | 0.408 (0.185) | 0.455 (0.206) | 0.396 (0.180) | 0.460 (0.209) | 0.624 (0.283) | 0.561 (0.254) | 0.190 (0.086) | 0.200 (0.091) | 0.284 (0.129) | 0.490 (0.222) |
| Aluminum concentration (ppm) | 10 | 10 | 10 | 10 | 10 | 5 | 20 | 20 | 20 | 9.8 |
| Aluminum flow rate (lb/hr) (kg/hr) | 0.385 (0.174) | 0.431 (0.196) | 0.375 (0.170) | 0.438 (0.199) | 0.590 (0.268) | 0.528 (0.240) | 0.357 (0.162) | 0.376 (0.171) | 0.534 (0.242) | 0.461 (0.209) |
| Reactor temperature (° C.) | 110 | 110 | 110 | 110 | 110 | 110 | 140 | 140 | 140 | 110 |
| Ethylene concentration in reactor exit stleam (weight percent) | 2.17 | 2.48 | 1.80 | 1.69 | 1.65 | 2.99 | 4.44 | 4.14 | 4.41 | 1.75 |
| Polymer density (g/cm³) | 0.858 | 0.855 | 0.875 | 0.871 | 0.870 | 0.897 | 0.929 | 0.963 | 0.968 | 0.872 |
| Polymer melt viscosity at 350° F. (centipoise) | 309000* | 350 | 39000* | 4200 | 355 | 5200 | 5600 | 5200 | 395 | 15,000 |
| Polymer melt index ($I_2$ at 190° C.) | 32 | 16200* | 246 | 1800* | 16000* | 1500* | 1400* | 1500* | 14500* | 583* |
| Polymer Mw | 60,400 | 8,700 | 30,100 | 16,500 | 7,900 | 15,600 | 15,800 | 15,800 | 7,300 | 23,200 |
| Polymer Mn | 29,100 | 4,600 | 17,100 | 9,100 | 4,300 | 8,700 | 8,900 | 8,000 | 3,700 | 11,900 |
| Polymer Mw/Mn | 2.08 | 1.89 | 1.76 | 1.81 | 1.84 | 1.79 | 1.78 | 1.98 | 1.97 | 1.95 |
| Peak crystallization temperature by DSC (° C.) | 23.73 | 27.13 | 55.73 | 55.44 | 59.05 | 78.57 | 102.76 | 116.01 | 114.76 | 55.73 |
| Peak melting temperature by DSC (° C.) | 45.63 | 57 | 68 | 67 | 67 | 91.04 | 112.22 | 129.23 | 127.6 | 68 |
| Total percent crystallinity by DSC | 7.46 | 9.98 | 18.94 | 17.78 | 19.55 | 36.3 | 38.42 | 76.03 | 79.62 | 18.94 |

| | K1 | L1 | M1 | N1 | O1 | P1 | Q1 | R1 |
|---|---|---|---|---|---|---|---|---|
| Ethylene feed (lb/hr) (kg/hr) | 3.0 (1.4) | 3.0 (1.4) | 3.0 (1.4) | 3.0 (1.4) | 3.0 (1.4) | 3.0 (1.4) | 3.0 (1.4) | 3.0 (1.4) |
| Comonomer: olefin ratio (mole percent) | 9.10 | 7.40 | 7.40 | 7.30 | 1.24 | 0.00 | 17.10 | 12.70 |
| Hydrogen: ethylene ratio (mole percent) | 0.54 | 0.42 | 0.56 | 0.76 | 2.14 | 2.14 | 0.54 | 0.62 |
| Diluent: ethylene ratio (weight basis) | 9.99 | 8.59 | 8.59 | 8.59 | 7.69 | 7.70 | 9.99 | 9.00 |
| Catalyst metal concentration (ppm) | 3 | 3 | 3 | 3 | 32 | 32 | 8 | 8 |
| Catalyst flow rate (lb/hr) (kg/hr) | 0.450 (0.204) | 0.466 (0.211) | 0.555 (0.252) | 0.713 (0.323) | 0.304 (0.138) | 0.294 (0.133) | 0.392 (0.178) | 0.207 (0.094) |
| Co-catalyst concentration (ppm) | 88 | 88 | 88 | 88 | 1430 | 1430 | 353 | 353 |
| Co-catalyst flow rate (lb/hr) (kg/hr) | 0.490 (0.222) | 0.500 (0.227) | 0.605 (0.274) | 0.777 (0.352) | 0.219 (0.099) | 0.211 (0.096) | 0.278 (0.126) | 0.150 (0.068) |
| Aluminum concentration (ppm) | 9.8 | 9.8 | 9.8 | 9.8 | 120.0 | 120.0 | 39.8 | 39.8 |
| Aluminum flow rate (lb/hr) (kg/hr) | 0.468 (0.212) | 0.480 (0.218) | 0.574 (0.260) | 0.731 (0.332) | 0.323 (0.147) | 0.311 (0.141) | 0.260 (0.118) | 0.141 (0.064) |
| Reactor temperature (° C.) | 110 | 120 | 110 | 110 | 110 | 110 | 110 | 110 |
| Ethylene concentration in reactor exit stream (weight percent) | 1.71 | 1.41 | 2.17 | 2.48 | 1.80 | 1.69 | 1.65 | 2.99 |
| Polymer density (g/cm³) | 0.883 | 0.898 | 0.897 | 0.894 | 0.948 | 0.960 | 0.868 | 0.887 |
| Polymer melt viscosity at 350° F. (centipoise) | 5000 | 15,000 | 5200 | 2500 | 350 | 512 | 5290 | 5000 |
| Polymer melt index ($I_2$ at 190° C. (g/10 min.)) | 1500* | 580* | 1500* | 2900* | 16000* | 11600* | | |
| Polymer Mw | 16,200 | 20,300 | 16,100 | 12,000 | 6,900 | 7,400 | | |
| Polymer Mn | 8,200 | 10,400 | 8,900 | 5,800 | 3,200 | 3,200 | | |
| Polymer Mw/Mn | 1.98 | 1.95 | 1.81 | 2.07 | 2.16 | 2.31 | | |
| Peak crystallization temperature by DSC (° C.) | 69.27 | 79.85 | 78.57 | 81.22 | 109.88 | 116.39 | 47.15 | 65.65 |
| Peak melting temperature by DSC (° C.) | 81.97 | 92.62 | 91.04 | 92.43 | 120.5 | 131.11 | 55 | 78.06 |
| Total percent crystallinity by DSC | 28.18 | 36.76 | 36.3 | 37.81 | 72.81 | 72.84 | 13.06 | 26.39 |

*Calculated on the basis of melt viscosity correlations in accordance with the formula: $I_2 = 3.6126(10^{\log(\eta) - 6.692)/-1.1363}) - 9.3185$, where $\eta$ = melt viscosity at 350° F. (177° C.).

The polymer products of Examples S1, T1, and U1 were produced in a solution polymerization process using a well-mixed recirculating loop reactor. Each polymer was stabilized with 2000 ppm IRGANOX ™ 1076 hindered polyphenol stabilizer (available from Ciba-Geigy Corporation) and 35 ppm deionized water (as a catalyst kill agent).

The ethylene and the hydrogen (as well as any ethylene and hydrogen which were recycled from the separator, were combined into one stream before being introduced into the diluent mixture, a mixture of $C_8$–$C_{10}$ saturated hydrocarbons, for example, ISOPAR™-E (available from Exxon Chemical Company) and the comonomer 1-octene.

The metal complex and cocatalysts were combined into a single stream and were also continuously injected into the reactor. The catalyst was as prepared in Catalyst Description Two set forth above; the primary cocatalyst was tri (pentafluorophenyl)borane, available from Boulder Scientific as a 3 weight percent solution in ISOPAR-E mixed hydrocarbon; and the secondary cocatalyst was modified methylalumoxane (MMAO Type 3A), available from Akzo Nobel Chemical Inc. as a solution in heptane having 2 weight percent aluminum.

Sufficient residence time was allowed for the metal complex and cocatalyst to react prior to introduction into the polymerization reactor. The reactor pressure was held constant at about 475 psig (3380 kPa).

After polymerization, the reactor exit stream was introduced into a separator where the molten polymer was separated from the unreacted comonomer(s), unreacted ethylene, unreacted hydrogen, and diluent mixture stream, which was in turn recycled for combination with flesh comonomer, ethylene, hydrogen, and diluent, for introduction into the reactor. The molten polymer was subsequently strand chopped or pelletized, and, after being cooled in a water bath or pelletizer, the solid pellets were collected. Table Six describes the polymerization conditions and the resultant polymer properties.

TABLE SIX

|  | S1 | T1 | U1 |
|---|---|---|---|
| Ethylene fresh feed rate (lbs/hr) (kg/hr) | 140 (63.5) | 140 (63.5) | 140 (63.5) |
| Total ethylene feed rate (lbs/hr) (kg/hr) | 146.2 (66.32) | 146.17 (66.30) | 146.5 (66.45) |
| Fresh octene feed rate (lbs/hr) (kg/hr) | 45.4 (20.6) | 49.5 (22.4) | 12.67 (5.75) |
| Total octene feed rate (lbs/hr) (kg/hr) | Not determined | 112 (50.8) | 32.9 (14.9) |
| Total octene concentration (weight percent) | Not determined | 11.4 | 3.36 |
| Fresh hydrogen feed rate (standard cm³/min) | 4025 | 5350 | 16100 |
| Solvent and octene feed rate (lbs/hr) (kg/hr) | 840 (381) | 839.4 (380.8) | 840 (381) |
| Ethylene conversion rate (wt percent) | 90.7 | 90.3 | 88.26 |
| Reactor temperature (° C.) | 109.86 | 119.8 | 134.3 |
| Feed temperature (° C.) | 15 | 15 | 15.3 |
| Catalyst concentration (ppm) | 70 | 70 | 70 |
| Catalyst flow rate (lbs/hr) (kg/hr) | 0.725 (0.329) | 1.265 (0.5738) | 4.6 (2.1) |
| Primary cocatalyst concentration (ppm) | 1200 | 203 1 | 1998 |
| Primary cocatalyst flow rate (lbs/hr) (kg/hr) | 2.96 (1.34) | 1.635 (0.7416) | 5.86 (2.66) |
| Primary cocatalyst to catalyst molar ratio (B:Ti) | 2.96 | 3.48 | 2.897 |
| Secondary cocatalyst concentration (ppm) | 198 | 198 | 198 |
| Secondary cocatalyst flow rate (lbs/hr) (kg/hr) | 0.718 (0.326) | 1.258 (0.571) | 3.7 (1.7) |
| Secondary cocatalyst to catalyst molar ratio (Al:Ti) | 5 | 4.986 | 4.037 |
| Product density (g/cm³) | 0.8926 | 0.8925 | 0.9369 |
| Product melt viscosity at 350° F. (centipoise) | 12,500 | 4,000 | 400 |
| Polymer melt index ($I_2$ at 190° C.)* | 686* | 1,900* | 14,000* |
| Polymer Mn | 12,300* | 8,900* | 4,700* |

*Calculated on the basis of melt viscosity correlations in accordance with the formulas: $I_2 = 3.6126(10^{\log(\eta)-6.6928})^{/-1.1363} - 9.3185$, $Mn = 10^{[(\log \eta + 10.46)/3.56)]}$ where $\eta$ = melt viscosity at 350° F. (177° C.).

Except as noted, Examples V1, W1, and X1 were prepared in accordance with the procedure set forth above with respect to Examples A1–R1. In particular, Examples V1 and W1 were prepared using a catalyst prepared in accordance with Catalyst Procedure 2. The additives employed were 1000 ppm lrganox™ 1076 hindered polyphenol stabilizer (available from Ciba-Geigy Corporation) and 100 ppm water. In the case of Example W1, ethylbenzene, rather than Isopar™ E mixed hydrocarbon, was utilized as the solvent.

Example X1 was prepared using a catalyst prepared in accordance with Catalyst Procedure 1. The additives employed were 1250 ppm calcium stearate, 500 ppm Irganox™ 1076 hindered polyphenol stabilizer (available from Ciba-Geigy Corporation), and 800 ppm PEPQ (tetrakis(2, 4-di-t-butylphenyl)-4,4'-biphenylene diphosphonite) (available from Clariant Corporation).

The run conditions employed and a description of the resultant polymers is set forth in the following Table Seven:

TABLE SEVEN

|  | V1 | W1 | X1 |
|---|---|---|---|
| Ethylene fresh feed rate (lbs/hr) (kg/hr) | 2.5 (1.1) | 3.5 (1.6) | 3.02 (1.37) |
| Total ethylene feed rate (lbs/hr) (kg/hr) | 2.5 (1.1) | 3.5 (1.6) | 3.02 (1.37) |
| Fresh octene feed rate (lbs/hr) (kg/hr) | 1.9 (0.86) | 1.52 (0.689) | 1.1 (0.50) |
| Total octene feed rate (lbs/hr) | 1.9 | 1.52 | 1.1 |
| Total octene concentration (weight percent) | 11.44 | 6.47 | 5.52 |
| Fresh hydrogen feed rate (standard cm³/min) | 199.9 | 292.4 | 124.9 |
| Solvent and octene feed rate (lbs/hr) (kg/hr) | 14.1 (6.40) | 20.04 (9.253) | 16.9 (7.66) |
| Ethylene conversion rate (wt percent) | 75.2 | 85.5 | 69.3 |
| Reactor temperature (° C.) | 119.8 | 136.3 | 140.4 |
| Feed temperature (° C.) | 26.9 | 33.93 | 40 |
| Catalyst concentration (ppm) | 12 | 2.4 | 5 |
| Catalyst flow rate (lbs/hr) (kg/hr) | 0.4543 (0.2061) | 0.60717 (0.27541) | 0.4174 (0.1893) |
| Primary cocatalyst concentration (ppm) | 92 | 92 | 393 |
| Primary cocatalyst flow rate (lbs/hr) (kg/hr) | 0.67 (0.30) | 0.3664 (0.1662) | 0.18967 (0.08603) |
| Primary cocatalyst to catalyst molar ratio (B:Ti) | — | 2.16 | 3.3 |
| Secondary cocatalyst concentration (ppm) | — | 2174 | 19.78 |
| Secondary cocatalyst flow rate (lbs/hr) (kg/hr) | — | 0.302 (0.137) | 0.3569 (0.1619) |
| Secondary cocatalyst to catalyst molar ratio (Al:Ti) | — | 8 | 6 |

TABLE SEVEN-continued

|  | V1 | W1 | X1 |
|---|---|---|---|
| Product density (g/cm³) | 0.890 | 0.930 | 0.920 |
| Product melt viscosity at 350° F. (177° C.) (centipoise) | 350 | 400 | 5620 |
| Polymer melt index (I₂ at 190° C.)* | 16,000 | 14,000 | 1400 |
| Polymer Mn* | 4500 | 4700 | 9800 |

*Calculated on the basis of melt viscosity correlations in accordance with the formulas: $I_2 = 3.6126 \, (10^{\log(\eta)-6.6928)/-1.1363)} - 9.3185$, $Mn = 10^{[\log\eta + 10.46)/3.56)]}$
where η melt viscosity at 350° F. (177° C.).

To a 4 liter autoclave stirred reactor, 865.9 g of ISOPAR™-E hydrocarbon (available from Exxon Chemical Company) and 800.4 g 1-octene were charged. The reactor was heated to 120° C. and hydrogen was added from a 75 cc cylinder. Hydrogen was added to cause a 250 psig (1800 kPa) pressure drop in the cylinder. The reactor was then pressurized to 450 psig (3200 kPa) of ethylene. Catalyst was added at the rate of 1 cc/min. The catalyst was as prepared in the Catalyst One Preparation set forth above and was mixed with other co-catalysts at a ratio of 1.5 mL of a 0.005 M of Catalyst Preparation One, 1.5 ml, of a 0.015 M solution of tris(pentafluorophenyl) borane in ISOPAR-E hydrocarbon mixture (a 3 wt percent solution of tris (pentafluorophenyl)borane in ISOPAR-E hydrocarbon mixture is available from Boulder Scientific), 1.5 mL of a 0.05 M solution of modified methylalumoxane in ISOPAR-E hydrocarbon mixture (MMAO Type 3A) (a solution of MMAO Type 3A in heptane with a 2 wt percent aluminum content is available from Akzo Nobel Chemical Inc.), and 19.5 mL of ISOPAR-E hydrocarbon mixture. Ethylene was supplied on demand. The reactor temperature and pressure were set at 120° C. and 450 psig (3200 kPa), respectively. The reaction continued for 23.1 minutes. At this time, the agitation was stopped and the reactor contents transferred to a glass collection kettle. The reactor product was dried in a vacuum oven overnight.

The ethylene/octene product thus prepared had a density of 0.867 g/cm³, and an $I_2$ at 190° C. of 842 g/10 min.

What is claimed is:

1. A polymer composition comprising:
   (a) a homogeneous ethylene polymer which is an interpolymer of ethylene with at least one comonomer selected from the group consisting of $C_3$–$C_{20}$ α-olefins, non-conjugated dienes, and cycloalkenes;
   (b) a wax; and
   (c) a nucleating agent,
   wherein the nucleating agent is provided in an effective amount such that the percent elongation at break of the polymer composition is at least about fifty percent greater than the percent elongation at break of a comparative composition which lacks the nucleating agent.

2. The polymer composition of claim 1, wherein the homogeneous ethylene polymer has a density less than about 0.910 g/cm³.

3. The polymer composition of claim 1, further comprising a second homogeneous ethylene/α-olefin interpolymer which differs from the homogeneous ethylene/α-olefin interpolymer of component (a) in terms of at least one of its density or its molecular weight.

4. The polymer composition of claim 3, wherein the homogeneous ethylene/α-olefin interpolymer of component (a) has a density of from about 0.855 g/cm³ to about 0.880 g/cm³ and a melt index ($I_2$) of from about 50 to about 200 g/10 min., and wherein the second homogeneous ethylene/α-olefin interpolymer has a density of from about 0.885 g/cm³ to about 0.900 g/cm³ and a melt viscosity at 350° C. of less than about 8000 centipoise.

5. The polymer composition of claim 1, comprising a wax having a crystalline melting point which is at least about 15° C. greater than that of the homogeneous ethylene polymer of component (a).

6. The polymer composition of claim 1, wherein the nucleating agent is provided in an amount of from about 0.01 to about 10 weight percent of the polymer composition.

7. The polymer composition of claim 1, comprising a wax in an amount of about 1 to about 40 weight percent of the polymer composition.

8. The polymer composition of claim 1, comprising a wax selected from the group consisting of paraffin waxes, microcrystalline waxes, Fischer-Tropsch waxes, polyethylene waxes, by-products of polyethylene waxes, homogeneous waxes, and combinations and mixtures thereof.

9. The polymer composition of claim 1, which is characterized as having a percent elongation at break of at least about 600 psi (4 MPa).

10. The polymer composition of claim 8, wherein the wax is a polyethylene wax wherein $M_w$ is less than 3000.

11. The polymer composition of claim 1, which is characterized as having a percent elongation at break of at least about 800 psi (5.5 MPa).

12. The polymer composition of claim 1, which is further characterized as having a yield stress and a break stress, each of which is within about 10 percent of the yield stress and break stress, respectively, of a comparative polymer composition that lacks the nucleating agent.

13. The polymer composition of claim 1, comprising a nucleating agent comprising preformed particles dispersed into the polymer composition.

14. The polymer composition of claim 13, wherein the nucleating agent comprises organophilic multi-layered particles.

15. The polymer composition of claim 14, wherein the nucleating agent comprises a montmorillonite clay treated with a quaternary ammonium salt.

16. The polymer composition of claim 1, comprising a nucleating agent comprising particles formed in situ in a melt of components of the polymer composition, the particles crystallizing at a higher temperature than said components of the polymer composition to form a fibrous network.

17. The polymer composition of claim 16, wherein the nucleating agent comprises an acetal.

18. The polymer composition of claim 17, wherein the nucleating agent comprises an acetal selected from the group consisting of trinaphthylidene sorbitol, tri (4-methyl-1-naphthylidene) sorbitol, tri (4-methoxy-1-naphthylidene) sorbitol, dibenzylidene zylitol, and 3,4-dimethyl dibenzylidene sorbitol, and combinations and mixtures thereof.

19. The polymer composition of claim 17, wherein the nucleating agent comprises 3,4-dimethyl dibenzylidene sorbitol.

20. A polymer composition comprising:
   (a) a homogeneous ethylene/α-olefin polymer which is an interpolymer of ethylene with at least one comonomer selected from the group consisting of $C_3$–$C_{20}$ α-olefins, non-conjugated dienes, and cycloalkenes;
   (b) a wax; and
   (c) nucleating agent which is an acetal;
   wherein the nucleating agent is provided in an effective amount such that the percent elongation at break of the polymer composition is at least about fifty percent greater than the percent elongation at break of a comparative composition which lacks the nucleating agent.

21. A polymer composition comprising:
   (a) a homogeneous ethylene/α-olefin polymer which is an interpolymer of ethylene with at least one comonomer selected from the group consisting of $C_3$–$C_{20}$ α-olefins, non-conjugated dienes, and cycloalkenes;
   (b) a wax; and
   (c) nucleating agent which is acetal selected from the group consisting of trinaphthylidene sorbitol, tri (4-methyl-1-naphthylidene) sorbitol, tri (4-methoxy-1-naphthylidene) sorbitol, dibenzylidene zylitol, and 3,4-dimethyl dibenzylidene sorbitol, and combinations and mixtures thereof;
wherein the nucleating agent is provided in an effective amount such that the percent elongation at break of the polymer composition is at least about fifty percent greater than the percent elongation at break of a comparative composition which lacks the nucleating agent.

22. A polymer composition comprising:
   (a) a homogeneous ethylene/α-olefin polymer which is an interpolymer of ethylene with at least one comonomer selected from the group consisting of $C_3$–$C_{20}$ α-olefins, non-conjugated dienes, and cycloalkenes;
   (b) a wax: and
   (c) a nucleating agent which is an organophilic multi-layered particle comprising a material selected from the group consisting of hydrophilic phyllosilicates, layered double hydroxides, multi-layered chlorides, multi-layered chalcogenides, multi-layered cyanides, multi-layered oxides, and functionalized organisilanes and combinations and mixtures thereof;
wherein the nucleating agent is provided in an effective amount such that the percent elongation at break of the polymer composition is at least about fifty percent greater than the percent elongation at break of a comparative composition which lacks the nucleating agent.

23. The polymer composition of claim 22, wherein the nucleating agent comprises a hydrophilic phyllosilicate selected from the group consisting of smectite clay minerals and illite minerals, and combinations and mixtures thereof.

24. The polymer composition of claim 23, wherein the nucleating agent comprises a montmorillonite clay treated with a quaternary ammonium salt.

25. The polymer composition of claim 22, wherein the nucleating agent comprises a hydrophilic multi-layered particle made organophilic by ion exchange with a material selected from the group consisting of a water-soluble polymer, a quaternary ammonium salt, an amphoteric surface-active agent, a chlorine compound, a hydrolyzed polymerizable metallic alcoholate, and a colloidal inorganic compound, and combinations and mixtures thereof.

26. A polymer composition comprising:
   (a) a homogeneous ethylene/α-olefin polymer which is an interpolymer of ethylene with at least one comonomer selected from the group consisting of $C_3$–$C_{20}$ α-olefins, non-conjugated dienes, and cycloalkenes;
   (b) a wax; and
   (c) a nucleating agent which is an organophilic multi-layered particle;
wherein the nucleating agent is provided in an effective amount such that the percent elongation at break of the polymer composition is at least about fifty percent greater than the percent elongation at break of a comparative composition which lacks the nucleating agent.

27. A polymer composition comprising:
   (a) a homogeneous ethylene/α-olefin polymer which is an interpolymer of ethylene with at least one comonomer selected from the group consisting of $C_3$–$C_{20}$ α-olefins, non-conjugated dienes, and cycloalkenes;
   (b) a wax selected from the group consisting of paraffin waxes, microcrystalline waxes, Fischer-Tropsch waxes, polyethylene waxes, by-products of polyethylene waxes, homogeneous waxes, and combinations and mixtures thereof; and
   (c) a nucleating agent selected from the group consisting of an organophilic multi-layered particle, and an acetal, and combinations and mixtures thereof;
wherein the nucleating agent is provided in an effective amount such that the percent elongation at break of the polymer composition is at least about fifty percent greater than the percent elongation at break of a comparative composition which lacks the nucleating agent.

28. The polymer composition of claim 27, wherein the wax is a polyethylene wax wherein $M_w$ is less than 3000.

* * * * *